United States Patent
Nakagawa et al.

(10) Patent No.: US 6,479,584 B1
(45) Date of Patent: Nov. 12, 2002

(54) RESIN COMPOSITION, POLYMER, AND PROCESS FOR PRODUCING POLYMER

(75) Inventors: Yoshiki Nakagawa, Kobe (JP); Katsuhiko Kimura, Kobe (JP); Masayuki Fujita, Kobe (JP); Kenichi Kitano, Kobe (JP)

(73) Assignee: Kaneka Corporation, Osaka (JP)

( * ) Notice: Subject to any disclaimer, the term of this patent is extended or adjusted under 35 U.S.C. 154(b) by 0 days.

(21) Appl. No.: 09/763,151

(22) PCT Filed: Aug. 20, 1999

(86) PCT No.: PCT/JP99/04470

§ 371 (c)(1),
(2), (4) Date: Aug. 9, 2001

(87) PCT Pub. No.: WO00/11056

PCT Pub. Date: Mar. 2, 2000

(30) Foreign Application Priority Data

Aug. 20, 1998 (JP) .............................. 10-234432
Oct. 15, 1998 (JP) .............................. 10-292674

(51) Int. Cl.[7] .......................... C08F 8/00; C08F 20/10; C08L 83/00
(52) U.S. Cl. .......................... 525/100; 525/98; 525/95; 525/314; 525/319; 525/330.3; 525/393; 525/431
(58) Field of Search ........................... 525/98, 95, 314, 525/319, 100, 330.3, 393, 431

(56) References Cited

U.S. PATENT DOCUMENTS

| 5,057,576 | A | * | 10/1991 | Spinelli | 525/288 |
|---|---|---|---|---|---|
| 5,393,841 | A | * | 2/1995 | Himes et al. | 525/314 |
| 5,756,585 | A | * | 5/1998 | Teyssie et al. | 525/299 |
| 5,763,548 | A | | 6/1998 | Matyjaszewski et al. | |
| 5,789,487 | A | | 8/1998 | Matyjaszewski et al. | |
| 5,807,937 | A | | 9/1998 | Matyjaszewski et al. | |
| 6,288,173 | B1 | | 9/2001 | Schimmel et al. | 525/294 |

FOREIGN PATENT DOCUMENTS

| EP | 0 789 036 A2 | 2/1997 |
|---|---|---|
| EP | 0 816 385 A1 | 6/1997 |
| WO | WO 96/30421 | 10/1996 |
| WO | WO 97/18247 | 5/1997 |
| WO | WO 98/01480 | 1/1998 |
| WO | WO 98/40415 | 9/1998 |
| WO | WO99/05184 | 2/1999 |

\* cited by examiner

Primary Examiner—James J. Seidleck
Assistant Examiner—Olga Asinovsky
(74) Attorney, Agent, or Firm—Connolly Bove Lodge & Hutz LLP

(57) ABSTRACT

The invention provides a resin composition comprising a crosslinking silyl-terminated stellar-structure vinyl polymer or a stellar-structure vinyl block copolymer or chain-extended vinyl block copolymer.

The invention provides a method of producing a stellar-structure vinyl block copolymer or chain-extended vinyl block copolymer which comprises forming a block copolymer using living radical polymerization and adding a compound having two or more polymerizable carbon-carbon double bonds at the end point of polymerization of the block copolymer.

36 Claims, No Drawings

RESIN COMPOSITION, POLYMER, AND PROCESS FOR PRODUCING POLYMER

TECHNICAL FIELD

The present invention relates to a resin composition comprising a specific stellar-structure vinyl polymer and a use thereof as well as such vinyl polymer and a method of producing the same.

BACKGROUND ART

Stellar polymers comprise linear arm polymers extending radially from the core and are known to have various properties different from straight chain polymers. Methods for synthesizing stellar polymers may roughly be divided into two classes. In one class, a certain number of armpolymer moieties are grown from a core compound or polymer and, in the other, an arm polymer is first prepared and a certain number of molecules thereof are linked together to form a stellar structure. For linking arms together, there are the method comprising reacting the polymer with a compound having a plurality of functional groups capable of reacting with a terminal functional group of the polymer and the method comprising adding a compound having a plurality of polymerizable groups after arm polymerization.

Such stellar polymers may be constituted of various homopolymer or copolymer species, such as polystyrene, poly(meth)acrylate, polydienes, polyethers, polyesters and polysiloxanes. For obtaining a controlled stellar structure, it is necessary, irrespective of production methods, to control the polymerization and, therefore, the technique of anionic polymerization, living cationic polymerization or polycondensation is employed in most cases.

Among the polymers obtainable by ionic polymerization or polycondensation, such as those mentioned above, those stellar-structure vinyl polymers which are obtainable by radical polymerization have scarcely been put to practical use. In particular, attempts have been made in vain to attain chain extension or construct a stellar structure by joining the growing terminus of a polymer molecule to that of another. Among vinyl polymers, (meth)acrylic polymers have high weathering resistance and transparency and other characteristics which the above-mentioned polyether polymers or hydrocarbon polymers or polyester polymers cannot have, hence those having an alkenyl group or a crosslinking silyl group on a side chain thereof are used in high weathering resistance coatings or the like. On the other hand, to control the polymerization of acrylic polymers is not easy due to side reactions involved therein. It is very difficult to attain chain extension or construct a stellar structure after polymerization.

On the other hand, vinyl polymers, in particular (meth) acrylic polymers, having a crosslinking silyl group(s) within the molecule thereof are utilized in high weathering resistance coatings making good use of the high weathering resistance of the main chain and the crosslinking points. These (meth)acrylic polymers are generally produced by copolymerizing a crosslinking silyl-containing (meth) acrylic monomer with some other monomer(s), so that the crosslinking silyl groups occur at random positions in the molecular chain, hence it is difficult to apply them to rubbers. On the other hand, attempts have been made to produce (meth) acrylic polymer having a crosslinking silyl group at a molecular terminus and use them in sealing materials or adhesives. As for the method of producing crosslinking silyl-terminated (meth)acrylic polymers, Japanese Kokoku Publication Hei-03-14068, for instance, discloses a method which comprises polymerizing a (meth) acrylic monomer in the presence of a crosslinking silyl-containing mercaptan, a crosslinking silyl-containing disulfide and a crosslinking silyl-containing radical polymerization initiator, and Japanese Kokoku Publication Hei-04-55444 discloses a method which comprises polymerizing an acrylic monomer in the presence of a crosslinking silyl-containing hydrosilane compound or a tetrahalosilane. Further, Japanese Kokai Publication Hei-06-211922 described a method of producing crosslinking silyl-terminated (meth)acrylic polymers which comprises first synthesizing a hydroxyl-terminated acrylic polymer by using a hydroxyl-containing polysulfide in excess relative to an initiator and then converting the hydroxyl group(s).

However, crosslinking silyl-terminated stellar-structure vinyl polymers have seldom been synthesized. Such a polymer, if successfully synthesized, would expectedly provide a curable composition having a higher gel fraction, showing a higher rate of curing and giving cured products higher in strength as compared with the straight-chain polymers having a crosslinking silyl group at both ends.

Meanwhile, block copolymers comprising various polymer blocks have recently been studied as thermoplastic elastomers or impact strength improving agents. However, as for the stellar polymers having block copolymer arms, few are known, since they are difficult to produce.

Accordingly, it is an object of the present invention to provide a resin composition comprising a stellar-structure vinyl polymer, in particular such a polymer producible by living radical polymerization, especially a curable composition comprising a crosslinking silyl-terminated stellar-structure vinyl polymer, and a resin composition comprising a chain-extended or stellar-structure vinyl polymer which has a block copolymer arm, as well as a vinyl polymer and a method for producing the same.

SUMMARY OF THE INVENTION

In a first aspect, the invention provides a resin composition which comprises a crosslinking silyl-terminated stellar-structure vinyl polymer (I) and a sealant or adhesive which comprises said resin composition.

In a second aspect, the invention provides a resin composition which comprises a stellar-structure vinyl block copolymer or chain-extended vinyl block copolymer (II) and a thermoplastic elastomer or impact resistance improving agent which comprises said resin composition.

In a third aspect, the invention provides a method of producing a stellar-structure vinyl block copolymer or chain-extended vinyl block copolymer which comprises forming a block copolymer using living radical polymerization and adding, at the end point of polymerization, a compound having two or more polymerizable carbon-carbon double bonds.

In a fourth aspect, the invention provides a stellar-structure vinyl block copolymer or chain-extended vinyl block copolymer obtainable by the method according to the third aspect of the invention.

In the following, the invention is described in detail.

DETAILED DISCLOSURE OF THE INVENTION

The invention, in its first aspect, lies in a resin composition comprising a crosslinking silyl-terminated stellar-structure vinyl polymer (I).

<<Polymer (I)>>

First, the crosslinking silyl-terminated stellar-structure vinyl polymer (I) is described.

The terminal crosslinking silyl group of the vinyl polymer (I) is not particularly restricted but includes those represented by the general formula (4):

$$-[Si(R^{16})_{2-b}(Y)_b O]_m-Si(R^{17})_{3-a}(Y)_a \qquad (4)$$

wherein $R^{16}$ and $R^{17}$ each represents a $C_{1-20}$ alkyl, aryl or aralkyl group or a triorganosiloxy group represented by $(R')_3SiO-$ (in which each R' represents $C_{1-20}$ monovalent hydrocarbon group and the three R' groups maybe the same or different) and, when there are a plurality of $R^{16}$ and/or $R^{17}$ groups, they may be the same or different; Y represents a hydroxyl group or a hydrolyzable group and, when two or more Y groups occur, they may be the same or different; a represents 0, 1, 2 or 3, b represents 0, 1 or 2 and m represents an integer of 0 to 19 on condition that the relation a+mb≧1 should be satisfied.

The hydrolyzable group represented by Y is not particularly restricted but may be any of those known in the art. Specifically, mention may be made of hydrogen, halogen, alkoxy, acyloxy, ketoximato, amino, amido, aminoxy, mercapto and alkenyloxy. For assuring hydrolyzability under mild conditions and ease of handling, alkoxy groups are particularly preferred. Each silicon atom may have 1 to 3 such hydrolyzable groups and/or hydroxyl groups, and a+mb, namely the total number of hydrolyzable groups is preferably within the range of 1 to 5. When two or more hydrolyzable groups and/or hydroxyl groups are contained in the crosslinking silyl group, they may be the same or different. The crosslinking silyl group may be comprised of one silicon atom or two or more silicon atoms and, in the case of silicon atoms connected by siloxane bonding, the number of silicon atoms may be up to about 20.

As specific examples of $R^{16}$ and $R^{17}$ in the general formula (4), there maybe mentioned alkyl groups such as methyl and ethyl, cycloalkyl groups such as cyclohexyl, aryl groups such as phenyl, aralkyl groups such as benzyl, and triorganosilyl groups represented by $(R')_3SiO-$ in which R' is methyl or phenyl.

Among these crosslinking silyl groups, crosslinking silyl groups represented by the general formula (5) are preferred:

$$-Si(R^{17})_{3-a}(Y)_a \qquad (5)$$

wherein $R^{17}$, Y and a are as defined-above. As specific examples of the crosslinking silyl group represented by the general formula (4) or (5), there may be mentioned, among others, $-SiCl_3$, $-Si(CH_3)Cl_2$, $-Si(CH_3)_2Cl$, $-Si(OCH_3)_3$, $-Si(CH_3)(OCH_3)_2$, $-Si(CH_3)_2OCH_3$, $-Si(OC_2H_5)_3$, $-Si(CH_3)(OC_2H_5)_2$, $-Si(CH_3)_2OC_2H_5$, $-Si(OC_3H_7)_3$, $-Si(C_5H_5)(OCH_3)_2$, $-Si(C_2H_5)_2OCH_3$, $-Si(C_6H_5)(OCH_3)_2$, $-Si(C_6H_5)_2(OCH_3)$, $-Si(CH_3)(OC(O)CH_3)_2$, $-Si(CH_3)_2O-[Si(CH_3)_2O]_2-Si(CH_3)(OCH_3)_2$ and $-Si(CH_3)[O-N=C(CH_3)_2]_2$
(in the above chemical formulas, $C_6H_5$ represents a phenyl group).

The monomer constituting the main chain of polymer (I) is not particularly restricted but may be any of various monomers. As examples, there may be mentioned (meth) acrylic monomers such as (meth)acrylic acid, methyl (meth)acrylate, ethyl (meth)acrylate, n-propyl (meth)acrylate, isopropyl (meth)acrylate, n-butyl (meth)acrylate, isobutyl (meth)acrylate, tert-butyl (meth)acrylate, n-pentyl (meth) acrylate, n-hexyl (meth)acrylate, cyclohexyl (meth)acrylate, n-heptyl (meth)acrylate, n-octyl (meth)acrylate, 2-ethylhexyl (meth)acrylate, nonyl (meth)acrylate, decyl (meth)acrylate, dodecyl (meth)acrylate, phenyl (meth) acrylate, toluyl (meth)acrylate, benzyl (meth)acrylate, 2-methoxyethyl (meth)acrylate, 3-methoxybutyl (meth) acrylate, 2-hydroxyethyl (meth)acrylate, 2-hydroxypropyl (meth)acrylate, stearyl (meth)acrylate, glycidyl (meth) acrylate, 2-aminoethyl (meth)acrylate, γ-(methacryloyloxypropyl)trimethoxysilane, (meth)acrylic acid-ethylene oxide adducts, trifluoromethylmethyl (meth) acrylate, 2-trifluoromethylethyl (meth)acrylate, 2-perfluoroethylethyl (meth)acrylate, 2-perfluoroethyl-2-perfluorobutylethyl (meth)acrylate, 2-perfluoroethyl (meth) acrylate, perfluoromethyl (meth)acrylate, diperfluoromethylmethyl (meth)acrylate, 2-perfluoromethyl-2-perfluoroethylmethyl (meth)acrylate, 2-perfluorohexylethyl (meth)acrylate, 2-perfluorodecylethyl (meth)acrylate and 2-perfluorohexadecylethyl (meth)acrylate; styrenic monomers such as styrene, vinyltoluene, α-methylstyrene, chlorostyrene, styrenesulfonic acid and salts thereof; fluorine-containing vinyl monomers such as perfluoroethylene, perfluoropropylene and vinylidene fluoride; silicon-containing vinyl monomers such as vinyltrimethoxysilane and vinyltriethoxysilane; maleic anhydride, maleic acid and monoalkyl esters and dialkyl esters of maleic acid; fumaric acid and monoalkyl esters and dialkyl esters of fumaric acid; maleimide monomers such as maleimide, methylmaleimide, ethylmaleimide, propylmaleimide, butylmaleimide, hexylmaleimide, octylmaleimide, dodecylmaleimide, stearylmaleimide, phenylmaleimide and cyclohexylmaleimide; nitrile-containing vinyl monomers such as acrylonitrile and methacrylonitrile; amido-containing vinyl monomers such as acrylamide and methacrylamide; vinyl esters such as vinyl acetate, vinyl propionate, vinyl pivalate, vinyl benzoate and vinyl cinnamate; alkenes such as ethylene and propylene; conjugated dienes such as butadiene and isoprene; vinyl chloride, vinylidene chloride, allyl chloride, allyl alcohol and so forth. These may be used singly or a plurality of them may be copolymerized. In the case of copolymerization, block copolymerization is preferred although both random copolymerization and block copolymerization may be employed. From the viewpoint of physical properties of products, among others, (meth)acrylic monomers, acrylonitrile monomers, aromatic vinyl monomers, fluorine-containing vinyl monomers and silicon-containing vinyl monomers are preferred among others. More preferred are acrylic ester monomers and methacrylic ester monomers. Butyl acrylate is still more preferred. In the practice of the present invention, these preferred monomers may be copolymerized with other monomers and, in such cases, the content of these preferred monomers is preferably 40% by weight. The expression "(meth) acrylic acid", for instance, so referred to hereinabove means "acrylic acid and/or methacrylic acid".

The polymer (I) of the invention is also characterized in that the molecular weight distribution is narrow, namely the ratio (Mw/Mn) of weight average molecular weight (Mw) to number average molecular weight (Mn) as determined by gel permeation chromatography (GPC) is small in value, although this characteristic feature has no limitative meaning. The molecular weight distribution value is preferably not more than 3, more preferably not more than 2, still more preferably not more than 1.8, yet more preferably not more than 1.6, in particular not more than 1.4, most preferably not more than 1.3. The GPC measurements in the practice of the invention are not particularly restricted but are generally carried out using polystyrene gel columns with chloroform as the mobile phase. The number average molecular weight and so on can be determined on the polystyrene equivalent basis. It is known that the molecular weight of a stellar polymer as determined by GPC is generally lower than the true molecular weight.

<Method of Producing Polymer (I)>

The polymer (I) is preferably produced by polymerizing a vinyl monomer(s) using living radical polymerization and adding, at the end point of polymerization, a compound having two or more polymerizable carbon-carbon double bonds, although this is not the only method employable.

The compound having two or more polymerizable carbon-carbon double bonds is not particularly restricted but is preferably a compound represented by the general formula (1), (2) or (3) given later herein.

In the following, the living radical polymerization is described.

Living radical polymerization is a radical polymerization in which the activity of the polymerization terminus is not lost but is maintained. While, in its narrow sense, the term "living polymerization" means the polymerization which proceeds while the terminal activity is maintained, it generally includes pseudo-living polymerization in which terminally inactivated species and terminally active species are in equilibrium. It is the latter definition that applies in the present invention. In recent years, living radical polymerization has been actively studied by a number of groups. As examples, there may be mentioned, among others, the technique using such a radical capping agent as a cobalt-porphyrin complex (J. Am. Chem. Soc., 1994, 116, 7943) or a nitroxide compound (Macromolecules, 1994, 27, 7228) and the atom transfer radical polymerization technique using an organic halide or the like as an initiator and a transition metal complex as a catalyst. Atom transfer radical polymerization is generally carried out using an organic halide or sulfonyl halide compound as an initiator and, as a catalyst, a metal complex containing a transition metal as the central metal. As specific references, there may be mentioned the reports by Matyjaszewski et al., J. Am. Chem. Soc., 1995, 117, 5614; Macromolecules, 1995, 2, 7901; and Science, 1996, 272, 866; as well as the reports by Sawamoto et al., Macromolecules, 1995, 28, 1721, International laid-open patent applications WO 96/30421 and WO 97/18247, among others. According to these techniques, the rate of polymerization is generally very high, and, in spite of the fact that they involve radical polymerization in which such a termination reaction as mutual coupling of radicals readily occurs, the polymerization proceeds in a living manner to give a polymer with a narrow molecular weight distribution (namely the value Mw/Mn is about 1.1 to 1.5), and the molecular weight can be arbitrarily controlled by selecting the monomer/initiator charge ratio.

The technique to be selected from among those mentioned above in the practice of the present invention is not particularly restricted but atom transfer radical polymerization is preferred because of the ease of control, among other advantages.

First, the technique which uses a radical capping agent such as a nitroxide compound is described. In this polymerization, a nitroxy free radical (=N—O.), which is generally stable, is used as the radical capping agent. While such a compound is not restricted, nitroxy free radicals from cyclic hydroxy amines, such as the 2,2,6,6-substituted-1-piperidinyloxy radical and 2,2,5,5-substituted-1-pyrrolidinyloxy radical, are preferred. Appropriate as the substituents are alkyl groups containing not more than 4 carbon atoms, such as methyl and ethyl groups. Specific nitroxy free radical compounds are not restricted but include 2,2,6,6-tetramethyl-1-piperidinyloxy radical (TEMPO), 2,2,6,6-tetraethyl-1-piperidinyloxy radical, 2,2,6,6-tetramethyl-4-oxo-1-piperidinyloxy radical, 2,2,5,5-tetramethyl-1-pyrrolidinyloxy radical, 1,1,3,3-tetramethyl-2-isoindolinyloxy radical and N,N-di-tert-butylaminoxy radical, among others. Such a stable free radical as the galvinoxyl free radical may be used in lieu of the nitroxy free radical.

The above radical capping agent is used in combination with a radical generator. It is presumable that the reaction product from a radical capping agent and a radical generator serve as a polymerization initiator and the polymerization of an addition-polymerizable monomer proceeds. The mixing ratio of the two agents is not particularly restricted but, appropriately, the radical initiator is used in an amount of 0.1 to 10 moles per mole of the radical capping agent.

Although various compounds can be used as the radical generator, a peroxide capable of generating a radical under polymerization temperature conditions is preferred. Such a peroxide is not restricted but includes diacyl peroxides such as benzoyl peroxide and lauroyl peroxide, dialkyl peroxides such as dicumyl peroxide and di-tert-butyl peroxide, peroxy dicarbonates such as diisopropyl peroxy dicarbonate and bis(4-tert-butylcyclohexyl) peroxydicarbonate, alkyl peresters such as tert-butyl peroxyoctoate and tert-butyl peroxybenzoate, and the like. In particular, benzoylperoxide is preferred. Further, another radical generator, for example a radical-generating azo compound such as azobisisobutyronitrile, may be used in lieu of the peroxide.

As reported in Macromolecules, 1995, 28, 2993, such alkoxyamine compounds as shown below may be used as the initiator instead of the combined use of a radical capping agent and a radical generator.

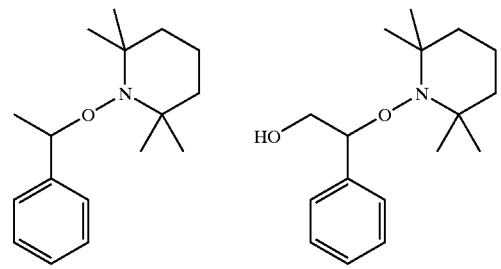

When an alkoxyamine compound is used as the initiator and the compound has a hydroxyl or like functional group, as indicated by either formula shown above, a functional group-terminated polymer is obtained. When this is applied to the above method, a functional group-terminated stellar polymer is obtained.

The monomer(s) to be used in the polymerization using a radical capping agent such as a nitroxide compound as mentioned above and the polymerization conditions such as solvent and polymerization temperature are not restricted but may be the same as those used in atom transfer radical polymerization to be mentioned below.

Then, the atom transfer radical polymerization, which is more preferred as the living radical polymerization, is described.

In this atom transfer radical polymerization, an organic halide, in particular an organic halide having a highly reactive carbon-halogen bond (e.g. an ester compound having a halogen at the α position, or a compound having a halogen at the benzyl position), or a sulfonyl halide compound or the like is preferably used as the initiator. The transition metal complex to be used as the catalyst in the above living radical polymerization is not particularly restricted but includes, as preferred species, transition metal complexes of the group 7, 8, 9, 10 or 11 and, as more preferred species, complexes of zero-valence copper, monovalent copper, divalent ruthenium, divalent iron or divalent nickel. Copper complexes are preferred among others. As specific examples of the monovalent copper compound, there may be mentioned cuprous chloride, cuprous bromide, cuprous iodide, cuprous cyanide, cuprous oxide and cuprous perchlorate. When a copper compound is used, a ligand, for example 2,2'-bipyridyl or a derivative thereof, 1,10-phenanthroline or a derivative thereof, or a polyamine such as tetramethylethylenediamine, pentamethyldiethylenetriamine or hexamethyltris(2-aminoethyl) amine, is added for increasing the catalytic activity. The tristriphenylphosphine complex of divalent ruthenium chloride ($RuCl_2(PPh_3)_3$) is also suited for use as a catalyst. When a ruthenium compound is used as a catalyst, an aluminum alkoxide is added as an activator. Further, the bistriphenylphosphine complex of divalent iron ($FeCl_2(PPh_3)_2$), the bistriphenylphosphine complex of divalent nickel ($NiCl_2(PPh_3)_2$) and the bistributylphosphine complex of divalent nickel ($NiBr_2(PBu_3)_2$) are also suited as catalysts.

In the atom transfer radical polymerization, an organic halide (e.g. an ester compound having a halogen at the α position, or a compound having a halogen at the benzyl position), or a sulfonyl halide compound or the like is used. The initiator is not restricted thereto. Specific examples are:
$C_6H_5—CH_2X$, $C_6H_5—C(H)(X)CH_3$, $C_6H_5—C(X)(CH_3)_2$
(in the above formulas, $C_6H_5$ denotes a phenyl group and X is a chlorine, bromine or iodine atom), $R^9—C(H)(X)—CO_2R^9$, $R^8—C(CH_3)(X)—CO_2R^9$, $R^8—C(H)(X)—C(O)R^9$, $R^8—C(CH_3)(X)—C(O)R^9$
(in the above formula, $R^8$ and $R^9$ are the same or different and each is a hydrogen atom, an alkyl group containing 1 to 20 carbon atoms, an aryl group containing 6 to 20 carbon atoms or an aralkyl group containing 7 to 20 carbon atoms and X is a chlorine, bromine or iodine atom), $R^8—C_6H_4—SO_2X$
(in the above formula, $R^8$ is a hydrogen atom, an alkyl group containing 1 to 20 carbon atoms, an aryl group containing 6 to 20 carbon atoms or an aralkyl group containing 7 to 20 carbon atoms and X is a chlorine, bromine or iodine atom), and so on.

While, in atom transfer radical polymerization, an initiator having two or more initiation sites is often used, a monofunctional initiator is preferred in the practice of the present invention.

An organic halide or sulfonyl halide compound having a functional group other than a functional group serving to initiate the polymerization may also be used as the initiator in atom transfer radical polymerization. In such a case, a vinyl polymer having a functional group at a main chain terminus is produced and, by coupling the same by the method of the present invention, a functional group-terminated stellar polymer is obtained. As such functional group, there may be mentioned an alkenyl group, a crosslinking silyl group, a hydroxyl group, an epoxy group, an amino group, an amido group and the like. When a crosslinking silyl-containing initiator is used, a crosslinking silyl-terminated stellar polymer of the present invention is readily obtained. It is also possible to use an initiator having another functional group to produce a functional group-terminated stellar polymer and then convert the functional group thereof to a crosslinking silyl group by the method described hereinafter.

The alkenyl-containing organic halide is not restricted but includes compounds having a structure represented by the general formula (6):

$$R^{11}R^{12}C(X)—R^{13}—R^{14}—C(R^{10})=CH_2 \qquad (6)$$

wherein $R^{10}$ is a hydrogen atom or a methyl group, $R^{11}$ and $R^{12}$ each is a hydrogen atom or a monovalent alkyl, aryl or aralkyl group containing 1 to 20 carbon atoms or both are mutually bonded together at the respective other ends, $R^{13}$ is —C(O)O— (ester group), —C(O)— (keto group) or an o-, m- or p-phenylene group, $R^{14}$ is a direct bond or a divalent organic group containing 1 to 20 carbon atoms, which may optionally contain one or more ether bonds, and X is a chlorine, bromine or iodine atom.

As specific examples of the substituents $R^{11}$ and $R^{12}$, there may be mentioned hydrogen, methyl, ethyl, n-propyl, isopropyl, butyl, pentyl, hexyl and the like. $R^{11}$ and $R^{12}$ may be combined together at the respective other ends to form a cyclic skeleton.

Specific examples of the alkenyl-containing organic halide represented by the general formula (6) are as follows:
$XCH_2C(O)O(CH_2)_nCH=CH_2$, $H_3CC(H)(X)C(O)O(CH_2)_nCH=CH_2$,
$(H_3C)_2C(X)C(O)O(CH_2)_nCH=CH_2$, $CH_3CH_2C(H)(X)C(O)O(CH_2)_nCH=CH_2$,

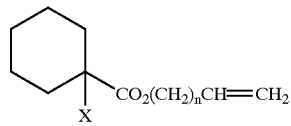

(in the above formulas, X is a chlorine, bromine or iodine atom a and n is an integer of 0 to 20);
$XCH_2C(O)O(CH_2)_nO(CH_2)_mCH=CH_2$, $H_3CC(H)(X)C(O)O(CH_2)_nO(CH_2)_mCH=CH_2$, $(H_3C)_2C(X)C(O)O(CH_2)_nO(CH_2)_mCH=CH_2$, $CH_3CH_2C(H)(X)C(O)O(CH_2)_nO(CH_2)_mCH=CH_2$,

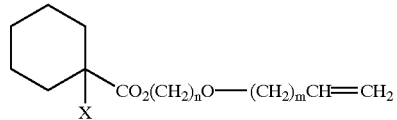

(in the above formulas, X is a chlorine, bromine or iodine atom, n is an integer of 1 to 20 and m is an integer of 0 to 20);

o, m, p-$XCH_2—C_6H_4—(CH_2)_n—CH=CH_2$, o, m, p-$CH_3C(H)(X)—C_6H_4—(CH_2)_n—CH=CH_2$, o, m, p-$CH_3CH_2C(H)(X)—C_6H_4—(CH_2)_n—CH=CH_2$,
(in the above formulas, X is a chlorine, bromine or iodine atom and n is an integer of 0 to 20);

o, m, p-$XCH_2—C_6H_4—(CH_2)_n—O—(CH_2)_m—CH=CH_2$, o, m, p-$CH_3C(H)(X)—C_6H_4—(CH_2)_n—O—(CH_2)_m—CH=CH_2$, o, m, p-$CH_3CH_2C(H)(X)—C_6H_4—(CH_2)_n—O—(CH_2)_m—CH=CH_2$,
(in the above formulas, X is a chlorine, bromine or iodine atom, n is an integer of 1 to 20 and m is an integer of 0 to 20);

o, m, p-$XCH_2—C_6H_4—O—(CH_2)_n—CH=CH_2$, o, m, p-$CH_3C(H)(X)—C_6H_4—O—(CH_2)_n—CH=CH_2$, o, m, p-$CH_3CH_2C(H)(X)—C_6H_4—O—(CH_2)_n—CH=CH_2$,
(in the above formulas, X is a chlorine, bromine or iodine atom and n is an integer of 0 to 20);

o, m, p-$XCH_2—C_6H_4—O—(CH_2)_n—O—(CH_2)_m—CH=CH_2$, o, m, p-$CH_3C(H)(X)—C_6H_4—O—(CH_2)_n—O—(CH_2)_m—CH=CH_2$, o, m, p-CH$_3$CH$_2$C(H)(X)—C$_6$H$_4$—O—(CH$_2$)$_n$—O—(CH$_2$)$_m$—CH=CH$_2$, (in the above formulas, X is a chlorine, bromine or iodine atom, n is an integer of 1 to 20 and m is an integer of 0 to 20).

As the alkenyl-containing organic halide, there may further be mentioned compounds represented by the general formula (7):

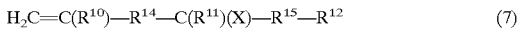

wherein R$^{10}$, R$^{11}$, R$^{12}$, R$^{14}$ and X are as defined above and R$^{15}$ is a direct bond, —C(O)O— (ester group), —C(O)— (keto group) or an o-, m- or p-phenylene group.

R$^{14}$ is a direct bond or a divalent organic group containing 1 to 20 carbon atoms (which may optionally contain one or more ether bonds) and, when it is a direct bond, the vinyl group is bonded to the carbon atom to which the halogen atom is bonded, hence the compound is an allyl halide. In this case, the carbon-halogen bond is activated by the neighboring vinyl group and therefore it is not always necessary for R$^{15}$ to be a C(O)O or phenylene group; thus, it may be a direct bond. When R$^{14}$ is not a direct bond, it is desirable that R$^{15}$ be a C(O)O, C(O) or phenylene group so as to activate the carbon-halogen bond.

Specific examples of the compound of formula (7) are as follows:

CH$_2$=CHCH$_2$X, CH$_2$=C(CH$_3$)CH$_2$X, CH$_2$=CHC(H)(X)CH$_3$, CH$_2$=C(CH$_3$)C(H)(X)CH$_3$, CH$_2$=CHC(X)(CH$_3$)$_2$, CH$_2$=CHC(H)(X)C$_2$H$_5$, CH$_2$=CHC(H)(X)CH(CH$_3$)$_2$, CH$_2$=CHC(H)(X)C$_6$H$_5$, CH$_2$=CHC(H)(X)CH$_2$C$_6$H$_5$, CH$_2$=CHCH$_2$C(H)(X)—CO$_2$R, CH$_2$=CH(CH$_2$)$_2$C(H)(X)—CO$_2$R, CH$_2$=CH(CH$_2$)$_3$C(H)(X)—CO$_2$R, CH$_2$=CH(CH$_2$)$_8$C(H)(X)—CO$_2$R, CH$_2$=CHCH$_2$C(H)(X)—C$_6$H$_5$, CH$_2$=CH(CH$_2$)$_2$C(H)(X)—C$_6$H$_5$, CH$_2$=CH(CH$_2$)$_3$C(H)(X)—C$_6$H$_5$ (in the above formulas, X is a chlorine, bromine or iodine atom and R is a C$_{1-20}$ alkyl, aryl or aralkyl group), and the like.

Specific examples of the alkenyl-containing sulfonyl halide compound are as follows:

o-, m-, p-CH$_2$=CH—(CH$_2$)$_n$—C$_6$H$_4$—SO$_2$X and o-, m-, p-CH$_2$=CH—(CH$_2$)$_n$—O—C$_6$H$_4$—SO$_2$X (in the above formulas, X is a chlorine, bromine or iodine atom and n is an integer of 0 to 20), and the like.

The above crosslinking silyl-containing organic halide is not restricted but includes, for example, compounds having a structure represented by the general formula (8):

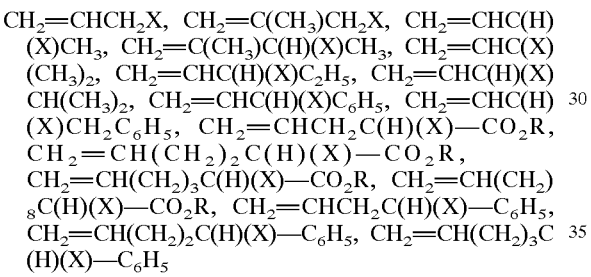

wherein R$^{10}$, R$^{11}$, R$^{12}$, R$^{13}$, R$^{14}$ and X are as defined, R$^{16}$ and R$^{17}$ each represents a C$_{1-20}$ alkyl, aryl or aralkyl group or a triorganosiloxy group of the formula (R')$_3$SiO— (in which R' is a monovalent hydrocarbon group containing 1 to 20 carbon atoms and the three R' groups may be the same or different) and, when two or more R$^{16}$ and/or R$^{17}$ groups are present, they may be the same or different, Y represents a hydroxyl group or a hydrolyzable group and, when two or more Y groups are present, they may be the same or different, a represents 0, 1, 2 or 3, b represents 0, 1 or 2 and m is an integer of 0 to 19, with the condition that the relation a+bm ☐ 1 should be satisfied.

Specific examples of the compound of general formula (8) are:

XCH$_2$C(O)O(CH$_2$)$_n$Si(OCH$_3$)$_3$, CH$_3$C(H)(X)C(O)O(CH$_2$)$_n$Si(OCH$_3$)$_3$, (CH$_3$)$_2$C(X)C(O)O(CH$_2$)$_n$Si(OCH$_3$)$_3$, XCH$_2$C(O)O(CH$_2$)$_n$Si(CH$_3$)(OCH$_3$)$_2$, CH$_3$C(H)(X)C(O)O(CH$_2$)$_n$Si(CH$_3$)(OCH$_3$)$_2$, (CH$_3$)$_2$C(X)C(O)O(CH$_2$)$_n$Si(CH$_3$)(OCH$_3$)$_2$, (in the above formulas, X is a chlorine, bromine or iodine atom and n is an integer of 0 to 20);

—XCH$_2$C(O)O(CH$_2$)$_n$O(CH$_2$)$_m$Si(OCH$_3$)$_3$, H$_3$CC(H)(X)C(O)O(CH$_2$)$_n$O(CH$_2$)$_m$Si(OCH$_3$)$_3$, (H$_3$C)$_2$C(X)C(O)O(CH$_2$)$_n$O(CH$_2$)$_m$Si(OCH$_3$)$_3$, CH$_3$CH$_2$C(H)(X)C(O)O(CH$_2$)$_n$O(CH$_2$)$_m$Si(OCH$_3$)$_3$, XCH$_2$C(O)O(CH$_2$)$_n$O(CH$_2$)$_m$Si(CH$_3$)(OCH$_3$)$_2$, H$_3$CC(H)(X)C(O)O(CH$_2$)$_n$O(CH$_2$)$_m$—Si(CH$_3$)(OCH$_3$)$_2$, (H$_3$C)$_2$C(X)C(O)O(CH$_2$)$_n$O(CH$_2$)$_m$—Si(CH$_3$)(OCH$_3$)$_2$, CH$_3$CH$_2$C(H)(X)C(O)O(CH$_2$)$_n$O(CH$_2$)$_m$—Si(CH$_3$)(OCH$_3$)$_2$, (in the above formulas, X is a chlorine, bromine or iodine atom, n is an integer of 1 to 20 and m is an integer of 0 to 20);

o, m, p-XCH$_2$—C$_6$H$_4$—(CH$_2$)$_2$Si(OCH$_3$)$_3$, o, m, p-CH$_3$C(H)(X)—C$_6$H$_4$—(CH$_2$)$_2$Si(OCH$_3$)$_3$, o, m, p-CH$_3$CH$_2$C(H)(X)—C$_6$H$_4$—(CH$_2$)$_2$Si(OCH$_3$)$_3$, o, m, p-XCH$_2$—C$_6$H$_4$—(CH$_2$)$_3$Si(OCH$_3$)$_3$, o, m, p-CH$_3$C(H)(X)—C$_6$H$_4$—(CH$_2$)$_3$Si(OCH$_3$)$_3$, o, m, p-CH$_3$CH$_2$C(H)(X)—C$_6$H$_4$—(CH$_2$)$_3$Si(OCH$_3$)$_3$, o, m, p-XCH$_2$—C$_6$H$_4$—(CH$_2$)$_2$—O—(CH$_2$)$_3$Si(OCH$_3$)$_3$, o, m, p-CH$_3$C(H)(X)—C$_6$H$_4$—(CH$_2$)$_2$—O—(CH$_2$)$_3$Si(OCH$_3$)$_3$, o, m, p-CH$_3$CH$_2$C(H)(X)—C$_6$H$_4$—(CH$_2$)$_2$—O—(CH$_2$)$_3$Si(OCH$_3$)$_3$, o, m, p-XCH$_2$—C$_6$H$_4$—O—(CH$_2$)$_3$Si(OCH$_3$)$_3$, o, m, p-CH$_3$C(H)(X)—C$_6$H$_4$—O—(CH$_2$)$_3$Si(OCH$_3$)$_3$, o, m, p-CH$_3$CH$_2$C(H)(X)—C$_6$H$_4$—O—(CH$_2$)$_3$Si(OCH$_3$)$_3$, o, m, p-XCH$_2$—C$_6$H$_4$—O—(CH$_2$)$_2$—O—(CH$_2$)$_3$—Si(OCH$_3$)$_3$, o, m, p-CH$_3$C(H)(X)—C$_6$H$_4$—O—(CH$_2$)$_2$—O—(CH$_2$)$_3$—Si(OCH$_3$)$_3$, o, m, p-CH$_3$CH$_2$C(H)(X)—C$_6$H$_4$—O—(CH$_2$)$_2$—O—(CH$_2$)$_3$Si(OCH$_3$)$_3$, (in the above formulas, X is a chlorine, bromine or iodine atom) and the like.

As further examples of the crosslinking silyl-containing organic halide compound, there may be mentioned compounds having a structure represented by the general formula (9):

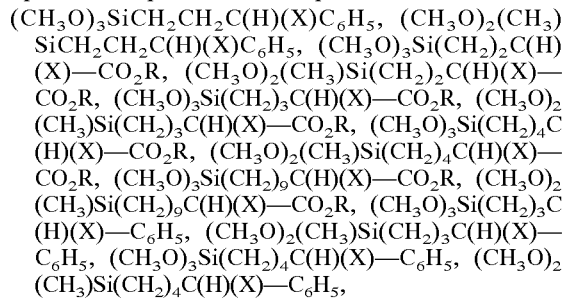

wherein R$^{10}$, R$^{11}$, R$^{12}$, R$^{14}$, R$^{15}$, R$^{16}$, R$^{17}$, a, b, m, X and Y are as defined above.

Specific examples of such compound are a follows:

(CH$_3$O)$_3$SiCH$_2$CH$_2$C(H)(X)C$_6$H$_5$, (CH$_3$O)$_2$(CH$_3$)SiCH$_2$CH$_2$C(H)(X)C$_6$H$_5$, (CH$_3$O)$_3$Si(CH$_2$)$_2$C(H)(X)—CO$_2$R, (CH$_3$O)$_2$(CH$_3$)Si(CH$_2$)$_2$C(H)(X)—CO$_2$R, (CH$_3$O)$_3$Si(CH$_2$)$_3$C(H)(X)—CO$_2$R, (CH$_3$O)$_2$(CH$_3$)Si(CH$_2$)$_3$C(H)(X)—CO$_2$R, (CH$_3$O)$_3$Si(CH$_2$)$_4$C(H)(X)—CO$_2$R, (CH$_3$O)$_2$(CH$_3$)Si(CH$_2$)$_4$C(H)(X)—CO$_2$R, (CH$_3$O)$_3$Si(CH$_2$)$_9$C(H)(X)—CO$_2$R, (CH$_3$O)$_2$(CH$_3$)Si(CH$_2$)$_9$C(H)(X)—CO$_2$R, (CH$_3$O)$_3$Si(CH$_2$)$_3$C(H)(X)—C$_6$H$_5$, (CH$_3$O)$_2$(CH$_3$)Si(CH$_2$)$_3$C(H)(X)—C$_6$H$_5$, (CH$_3$O)$_3$Si(CH$_2$)$_4$C(H)(X)—C$_6$H$_5$, (CH$_3$O)$_2$(CH$_3$)Si(CH$_2$)$_4$C(H)(X)—C$_6$H$_5$, (in the above formulas, X is a chlorine, bromine or iodine atom and R is a C$_{1-20}$ alkyl, aryl or aralkyl group) and the like.

The hydroxyl-containing organic halide or sulfonyl halide compound is not particularly restricted but may be a compound of the formula:

HO—(CH$_2$)$_n$—OC(O)C(H)(R)(X)

wherein X is a chlorine, bromine or iodine atom, R is a hydrogen atom or a C$_{1-20}$ alkyl, aryl or aralkyl group and n is an integer of 1 to 20.

The amino-containing organic halide or sulfonyl halide compound is not particularly restricted but may be a compound of the formula:

wherein X is a chlorine, bromine or iodine atom, R is a hydrogen atom or a $C_{1-20}$ alkyl, aryl or aralkyl group and n is an integer of 1 to 20.

The epoxy-containing organic halide or sulfonyl halide compound is not particularly restricted but may be a compound of the formula:

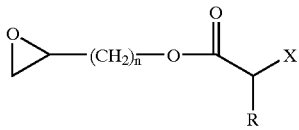

wherein X is a chlorine, bromine or iodine atom, R is a hydrogen atom or a $C_{1-20}$ alkyl, aryl or aralkyl group and n is an integer of 1 to 20.

The living radical polymerization according to the present invention can be carried out in the absence of or in any of various solvents. As the solvents, there may be mentioned hydrocarbon solvents such as benzene and toluene; ether solvents such as diethyl ether, tetrahydrofuran, diphenyl ether, anisole and dimethoxybenzene; halogenated hydrocarbon solvents such as methylene chloride, chloroform and chlorobenzene; ketone solvents such as acetone, methyl ethyl ketone and methyl isobutyl ketone; alcohol solvents such as methanol, ethanol, propanol, isopropanol, n-butyl alcohol and tert-butyl alcohol; nitrile solvents such as acetonitrile, propionitrile and benzonitrile; ester solvents such as ethyl acetate and butyl acetate; carbonate solvents such as ethylene carbonate and propylene carbonate; and so on. These may be used singly or two or more of them may be used in admixture. It is also possible to carry out the polymerization in an emulsion system or a system in which the supercritical fluid $CO_2$ is used as a medium.

In the practice of the invention, the polymerization can be carried out within the temperature range of 0° C. to 200° C., preferably room temperature to 150° C., although it is not limited thereto.

When a compound having two or more polymerizable carbon-carbon double bonds is added at the end point of such living radical polymerization as mentioned above, a coupling reaction takes place to give a chain-extended polymer or a stellar-structure polymer. The end point of polymerization is preferably the time point at which the monomer conversion is not less than 80%, more preferably not less than 90%, still more preferably not less than 95%, most preferably not less than 99%.

The compound having two or more polymerizable carbon-carbon double bonds is selected from among compounds represented by the following formula (1), (2) or (3), although that compound is not limited thereto.

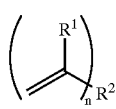

(1)

wherein $R^1$ is a phenyl group, —CN or —$CO_2R^3$ (in which $R^3$ is a monovalent hydrocarbon group containing 1 to 20 carbon atoms), $R^2$ is a divalent or polyvalent hydrocarbon group containing 1 to 20 carbon atoms or a divalent or polyvalent group containing 1 to 20 carbon atoms as derived from two or more hydrocarbon groups bonded together by ester or ether bonding, and n is an integer not less than 2;

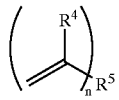

(2)

wherein $R^4$ is a hydrogen atom, a methyl group or a monovalent hydrocarbon group containing 1 to 20 carbon atoms, $R^5$ is a divalent or polyvalent benzene or naphthalene group, and n is an integer not less than 2;

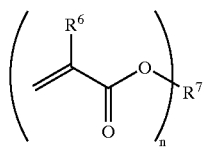

(3)

wherein $R^6$ is a hydrogen atom, a methyl group, —CN or a monovalent hydrocarbon group containing 1 to 20 carbon atoms, $R^7$ is a divalent or polyvalent hydrocarbon group containing 1 to 20 carbon atoms or a divalent or polyvalent group containing 1 to 20 carbon atoms as derived from two or more hydrocarbon groups bonded together by ester or ether bonding, and n is an integer not less than 2.

Referring to the above formulas, the monovalent $C_{1-20}$ hydrocarbon group represented by $R^3$, $R^4$ and/or $R^6$ is not particularly restricted but includes the following:

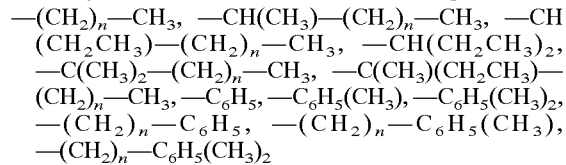

(n being an integer not less than 0 and the total number of carbon atoms contained in each group being not more than 20).

Referring to the above formulas, $R^2$ and $R^7$ are not restricted but include the following groups:

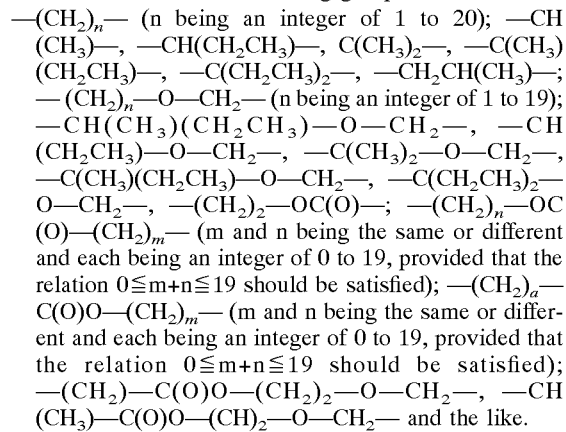

Further $R^2$ and $R^7$ may contain a benzene ring. As specific examples of that case, there may be mentioned o-, m- or p-$C_6H_4$—, o-, m- or p-$C_6H_4$—$CH_2$—, o-, m- or p-$C_6H_4$—O—$CH_2$—, o-, m- or p-$C_6H_4$—O—$CH(CH_3)$—, o-, m- or p-$C_6H_4$—O—$C(CH_3)_2$—; o-, m- or p-$C_6H_4$—$(CH_2)_n$— (n being an integer of 0 to 14); o-, m- or p-$C_6H_4$—O—$(CH_2)_n$— (n being an integer of 0 to 14); o-, m- or p-$CH_2$—$C_6H_4$—, o-, m- or p-$CH_2$—$C_6H_4$—$CH_2$—, o-, m- or p-CH$_2$—C$_6$H$_4$—O—CH$_2$—, o-, m- or p-CH$_2$—C$_6$H$_4$—O—CH(CH$_3$)—; o-, m- or p-CH$_2$—C$_6$H$_4$—O—C(CH$_3$)$_2$—; o-, m- or p-CH$_2$—C$_6$H$_4$—(CH$_2$)$_n$— (n being an integer of 0 to 13); o-, m- or p-CH$_2$—C$_6$H$_4$—O—(CH$_2$)$_n$— (n being an integer of 0 to 13); o-, m- or p-C(O)—C$_6$H$_4$—C(O)O—(CH$_2$)$_n$— (n being an integer of 0 to 12) and the like.

Specific examples of the above compounds are not particularly restricted but include polyvinyl aromatic compounds such as 1,3-divinylbenzene, 1,4-divinylbenzene, 1,2-diisopropenylbenzene, 1,3-diisopropenylbenzene, 1,4-diisopropenylbenzene, 1,3-divinylnaphthalene, 1,8-divinylnaphthalene, 2,4-divinylbiphenyl, 1,2-divinyl-3,4-dimethylbenzene, 1,3-divinyl-4,5,8-tributylnaphthalene and 2,2'-divinyl-4-ethyl-4'-propylbiphenyl, poly(meth)acrylates such as ethylene glycol dimethacrylate and ethylene glycol diacrylate, among others. Among these, polyvinyl aromatic compounds are preferred and, further divinylbenzenes and diisopropenylbenzenes are preferred.

The addition amount of the compound having at least two polymerizable alkenyl groups is not particularly restricted but preferably is such that the number of olefins thereof is at least equal to the number of growing arm polymer termini. At a lower amount, uncoupled polymer molecules may remain in large amounts. More preferably, the addition amount of the compound having two or more polymerizable alkenyl groups, though not particularly restricted, is such that the number of olefins thereof is not more than 20 times, more preferably not more than 10 times, most preferably not more than 5 times, the number of growing arm polymer termini.

The reaction conditions after addition of the coupling agent are not particularly restricted but may be the same as the arm polymer polymerization conditions.

<Terminal Crosslinking Silyl Group Introduction>

The method of introducing a crosslinking silyl group terminally into the vinyl polymer (I) of the present invention is not particularly restricted but various methods can be utilized. It is possible to directly produce the desired polymer by using the above-mentioned crosslinking silyl-containing initiator. When an initiator having another functional group was used, a crosslinking silyl group may be introduced by the subsequent conversion. In the following, production methods [A] to [C] are described but these have no limitative meaning.

[A] Method comprising adding a crosslinking silyl-containing hydrosilane compound to an alkenyl-terminated stellar vinyl polymer.

The crosslinking silyl-containing hydrosilane compound to be used in carrying out the above production method [A] is not particularly restricted but maybe, for example, a compound represented by the general formula (10):

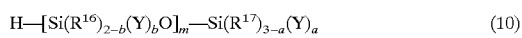
$$\text{H—[Si(R}^{16}\text{)}_{2-b}\text{(Y)}_b\text{O]}_m\text{—Si(R}^{17}\text{)}_{3-a}\text{(Y)}_a \quad (10)$$

wherein R$^{16}$, R$^{17}$, a, b, m and Y are as defined above.

Among them, compounds represented by the following general formula (11) are preferred because of ready availability:

$$\text{H—Si(R}^{17}\text{)}_{3-a}\text{(Y)}_a \quad (11)$$

wherein R$^{17}$, Y and a are as defined above.

In the above production method [A], a transition metal catalyst is generally used as a hydrosilylation catalyst.

The above transition metal catalyst is not particularly restricted but includes, among others, platinum as simple substance, solid platinum dispersed on a support such as alumina, silica and carbon black; chloroplatinic acid; complexes of chloroplatinic acid with an alcohol, aldehyde, ketone or the like; platinum-olefin complexes, platinum(0)-divinyltetramethyldisiloxane complex; and compounds other than platinum compounds, for example RhCl(PPh$_3$)$_3$, RhCl$_3$, RuCl$_3$, IrCl$_3$, FeCl$_3$, AlCl$_3$, PdCl$_2$.H$_2$O, NiCl$_2$, and TiCl$_4$. These may be used singly or two or more of them may be used in combination.

The method of producing the alkenyl-containing vinyl polymer to be used in the above production method [A] is not particularly restricted but may be one of the methods [A-a] to [A-e] mentioned later herein, for instance.

[B] Method comprising reacting a hydroxyl-terminated stellar vinyl polymer with a compound having both a crosslinking silyl group and a functional group capable of reacting with the hydroxyl group, for example an isocyanato group.

The compound having both a crosslinking silyl group and a functional group capable of reacting with the with the hydroxyl group, for example an isocyanato group, which is to be used in the above production method [B] is not particularly restricted but includes, among others, γ-isocyanatopropyl-trimethoxysilane, γ-isocyanatopropylmethyldimethoxysilane and γ-isocyanatopropyltriethoxysilane. These may be used singly or two or more of them may be used combinedly.

In carrying out the reaction according to the above production method [B], a urethane formation reaction catalyst known in the art may be used.

The method of producing the hydroxyl-terminated stellar vinyl polymer to be used in the above production method [B] is not particularly restricted but, for example, the method [B-a] mentioned later herein may be mentioned.

[C] Method comprising reacting a compound having both a polymerizable alkenyl group and a crosslinking silyl group, together with a predetermined vinyl monomer in synthesizing a vinyl polymer by radical polymerization.

When a compound having both a polymerizable alkenyl group and a crosslinking silyl group is subjected to reaction at an early stage of such living radical polymerization as mentioned above in which monomers are added sequentially, the crosslinking silyl group can be introduced terminally in the same manner as in the case in which a crosslinking silyl-containing initiator is used.

The compound having both a polymerizable alkenyl group and a crosslinking silyl group to be used in the above production method [C] is not particularly restricted but includes, among others, compounds represented by the general formula (12) shown below, for example trimethoxysilylpropyl (meth)acrylate and methyldimethoxysilylpropyl (meth)acrylate:

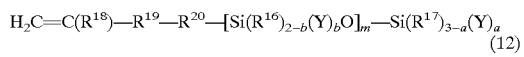
$$\text{H}_2\text{C=C(R}^{18}\text{)—R}^{19}\text{—R}^{20}\text{—[Si(R}^{16}\text{)}_{2-b}\text{(Y)}_b\text{O]}_m\text{—Si(R}^{17}\text{)}_{3-a}\text{(Y)}_a \quad (12)$$

wherein R$^{16}$, R$^{17}$, Y, a, b and m are as defined above, R$^{18}$ represents a hydrogen atom or methyl group, R$^{19}$ represents —C(O)O— or an o-, m- or p-phenylene group, and R$^{20}$ represents a direct bond or a C$_{1-20}$ divalent organic group which may optionally contain one or more ether bonds. These may be used singly or two or more of them may be used in combination.

Some methods [A-a] to [A-e] of producing the vinyl polymer having at least one alkenyl group which is to be used in the above production method [A] are described below. They have no limitative meaning, however.

The following production method [A-a] is an example of the method directly synthesizing a vinyl polymer having at least one alkenyl group.

[A-a] Method comprising reacting a compound having both a polymerizable alkenyl group and an alkenyl group low in polymerizability, together with a predetermined vinyl monomer, in synthesizing a vinyl polymer by radical polymerization. When a compound having both a polymerizable alkenyl group and an alkenyl group low in polymerizability is subjected to reaction at an early stage of such living radical polymerization as mentioned above in which monomers are added sequentially, terminal alkenyl group can be introduced in the same manner as in the case in which a crosslinking silyl-containing initiator is used.

The compound having both a polymerizable alkenyl group and an alkenyl group low in polymerizability to be used in the above production method [A-a] is not particularly restricted but includes, among others, compounds represented by the following general formula (13):

$$H_2C=C(R^{18})-R^{19}-R^{21}-C(R^{22})=CH_2 \qquad (13)$$

wherein $R^{18}$ and $R^{19}$ are as defined above, $R^{21}$ represents a direct bond or a $C_{1-20}$ divalent organic group which may optionally contain one or more ether bonds and $R^{22}$ represents a hydrogen atom, a $C_{1-10}$ alkyl group, $C_{6-10}$ aryl group or $C_{7-10}$ aralkyl group.

The following production methods [A-b] to [A-e] are examples of the method of obtaining an alkenyl group-terminated stellar vinyl polymer from a hydroxyl-terminated stellar vinyl polymer. The method of producing the hydroxyl-terminated stellar vinyl polymer is not particularly restricted but the polymer can be obtained, for example, by the above-mentioned method using a hydroxyl-containing initiator or by the production method [B-a] mentioned later herein.

[A-b] Method comprising reaction of a vinyl polymer having at least one hydroxyl group with a base, such as sodium hydroxide and sodium methoxide, and then reacting the same with an alkenyl-containing halide, such as allyl chloride.

[A-c] Method comprising reacting a vinyl polymer having at least one hydroxyl group with an alkenyl-containing isocyanate compound, such as allyl isocyanate.

[A-d] Method comprising reacting a vinyl polymer having at least one hydroxyl group with an alkenyl-containing acid halide, such as (meth)acryloyl chloride, in the presence of a base, such as pyridine.

[A-e] Method comprising reacting a vinyl polymer having at least one hydroxyl group with an alkenyl-containing carboxylic acid, such as acrylic acid, in the presence of an acid catalyst.

The method of producing the hydroxyl-terminated stellar vinyl polymer to be used in the above production methods [B] and [A-b] to [A-e] is not particularly restricted but there may be mentioned the method using the above-mentioned hydroxyl-containing initiator and the method [B-a] mentioned below, among others.

[B-a] Method comprising reacting a compound having both a polymerizable alkenyl group, such as one represented by the general formula (14) shown below, and a hydroxyl group, together with a predetermined monomer, in synthesizing a vinyl polymer by radical polymerization. When a compound having both a polymerizable alkenyl group and a hydroxyl group is subjected to reaction at an early stage of such living radical polymerization as mentioned above in which monomers are added sequentially, terminal hydroxyl group can be introduced in the same manner as in the case in which a hydroxyl-containing initiator is used.

$$H_2C=C(R^{18})-R^{19}-R^{21}-OH \qquad (14)$$

In the formula, $R^{18}$, $R^{19}$ and $R^{21}$ are as defined above.

<<Resin Composition>>

The constitution of the resin composition comprising the crosslinking silyl-terminated stellar vinyl polymer (I) of the invention is described in the following.

A condensation catalyst may or may not be used in curing the composition of the invention. As the condensation catalyst, one or more of known silanol condensation catalysts such as the following may be used as necessary: titanate esters such as tetrabutyl titanate and tetrapropyl titanate; organotin compounds such as dibutyltin dilaurate, dibutyltin maleate, dibutyltin diacetate, stannous octoate and stannous naphthenate; lead octylate, amine compounds such as butylamine, octylamine, dibutylamine, monoethanolamine, diethanolamine, triethanolamine, diethylenetriamine, triethylenetetramine, oleylamine, octylamine, cyclohexylamine, benzylamine, diethylaminopropylamine, xylylenediamine, triethylenediamine, guanidine, diphenylguanidine, 2,4,6-tris(dimethylaminomethyl)phenol, morpholine, N-methylmorpholine and 1,3-diazabicyclo[5.4.6]undecene-7, or carboxylic acid salts thereof; low-molecular-weight polyamide resins obtained from an excess of a polyamine and a polybasic acid; reaction products from an excess of a polyamine and an epoxy compound; amino-containing silane coupling agents, for example, γ-aminopropyltrimethoxysilane and N-(β-aminoethyl) aminopropylmethyldimethoxysilane; and so on. The addition amount is preferably 0.01 to 10% by weight based on the vinyl polymer (I). When the hydrolyzable group Y is an alkoxy group, this polymer, if alone, shows a slow rate of curing, hence the use of a curing catalyst is preferred.

Since the polymer of the invention itself has adhesiveness to glass, ceramics other than glass, metals and so forth or can be adhered to a wide range of materials by using various primers, an adhesion promoter is not always necessary but, for attaining stable adhesiveness to various substrates, parts, supports and adherends, the use thereof is preferred.

As the adhesion promoter, there may be mentioned cresol type or novolak type phenol resins obtained by reacting a phenolic compound, such as phenol, cresol, xylenol, resorcinol, an alkylphenol or a modified phenol (e.g. cashew oil-modified phenol, tall oil-modified phenol), with an aldehyde compound, such as formalin and paraformaldehyde; sulfur; epoxy resins such as bisphenol A-based epoxy resins, bisphenol F-based epoxy resins, novolak-based epoxy resins, bisphenol A-propylene oxide adduct glycidyl ether type epoxy resins and hydrogenated bisphenol A-based epoxy resins; alkyl titanates such as tetrabutyl titanate, aromatic polyisocyanates such as tolylene diisocyanate and diphenylmethanediisocyanate; compounds having an amino group and a crosslinking silyl group per molecule, such as γ-aminopropyltrimethoxysilane, γ-aminopropyltriethoxysilane, γ-aminopropylmethyldimethoxysilane, N-(β-aminoethyl)-γ-aminopropyltrimethoxysilane, N-(β-aminoethyl)-γ-aminopropyltriethoxysilane and N-(β-aminoethyl)-γ-aminopropylmethyldimethoxysilane; compounds having an epoxy group and a crosslinking silyl group per molecule, such as γ-glycidoxypropyltrimethoxysilane, γ-glycidoxypropyltriethoxysilane and γ-glycidoxypropylmethyldimethoxysilane; compounds having a mercapto group and a crosslinking silyl group per molecule, such as γ-mercaptopropyltrimethoxysilane, γ-mercaptopropyltriethoxysilane and γ-mercaptopropylmethyldimethoxysilane; compounds having an isocyanato group and a crosslinking silyl group per molecule, such as γ-isocyanatopropyltrimethoxysilane, γ-isocyanatopropyltriethoxysilane and γ-isocyanatopropylmethyldimethoxysilane; reaction products of a compound having an amino group and a crosslinking silyl group per molecule as mentioned above with a compound having an epoxy group and a crosslinking silyl group per molecule or a compound having an isocyanato group and a crosslinking silyl group per molecule as mentioned above; reaction products of a compound having a (meth)acryloxy group and a crosslinking silyl group per molecule, such as γ-(meth)acryloxypropyltrimethoxysilane, γ-(meth)acryloxypropyltriethoxysilane and γ-(meth)acryloxypropylmethyldimethoxysilane, and a compound having an amino group and a crosslinking silyl group per molecule as mentioned above; and so on. These maybe used singly or two or more of them may be used combinedly. Among them, compounds having an organic group containing at least one atom selected from among nitrogen, oxygen and sulfur atoms and a crosslinking silyl group per molecule, such as compounds having an amino group and a crosslinking silyl group per molecule, compounds having an epoxy group and a crosslinking silyl group per molecule, compounds having a mercapto group and a crosslinking silyl group per molecule, reaction products of a compound having an amino group and a crosslinking silyl group per molecule with a compound having an epoxy group and a crosslinking silyl group per molecule, reaction products of a compound having a (meth)acryloxy group and a crosslinking silyl group per molecule with a compound having an amino group and a crosslinking silyl group per molecule are preferred since these are relatively easy to control the physical properties and adhesiveness. Those compounds having a nitrogen-containing organic group and a crosslinking silyl group in which the above-mentioned organic group containing at least one atom selected from among nitrogen, oxygen and sulfur atoms is an amino group, an isocyanato group or a group resulting from reaction of these are more preferred from the high adhesiveness viewpoint.

The above adhesion promoter is preferably used in an amount of 0.01 to 20 parts by weight per 100 parts by weight of the vinyl polymer (I). When the amount is 0.01 part by weight, the adhesiveness improving effect can hardly be produced. An amount exceeding 20 parts by weight adversely affects the physical properties of cured products. The addition amount of the adhesion promoter is preferably 0.01 to 10 parts by weight, more preferably 0.5 to 5 parts by weight.

A physical property modifier may be used in order to increase the hardness upon curing of the resin composition or decrease the hardness to increase the elongation instead or otherwise modify the physical properties. The physical property modifier includes, for example, alkylalkoxysilanes such as methyltrimethoxysilane, dimethyldimethoxysilane, trimethylmethoxysilane and n-propyltrimethoxysilane; alkylisopropenoxysilanes such as dimethyldiisopropenoxysilane, methyltriisopropenoxysilane and γ-glycidoxypropylmethyldiisopropenoxysilane; various silane coupling agents such as vinyltrimethoxysilane and vinylmetyldimethoxysilane, silicone varnishes; polysiloxanes; and the like, and these are to be added as necessary. Addition in an amount within the range of 0.1 to 20 parts by weight per 100 parts by weight of the vinyl polymer (I) gives good results.

A curability modifier may be added to increase or decrease the rate of curing of the resin composition and, further, a storage stability improving agent may be added in order to inhibit the viscosity from increasing during storage. As the curability modifier or storage stability improver, there may be mentioned alcohols such as methanol and ethanol; ortho esters such as methyl orthoformate; crosslinking silyl-containing compounds such as tetraethoxysilane, methyltrimethoxysilane and vinyltrimethoxysilane; carboxylic acids such as 2-ethylhexanoic acid, and so forth. Addition in an amount within the range of 0 to 20 parts by weight gives favorable results.

Various fillers may be incorporated in the resin composition of the invention according to the use thereof. Usable as the filler are reinforcing fillers such as fumed silica, precipitated silica, silicic anhydride, hydrous silicic acid and carbon black; fillers such as calcium carbonate, magnesium carbonate, diatomaceous earth, calcined clay, clay, talc, titanium oxide, bentonite, organic bentonite, ferric oxide, zinc oxide, activated zinc white and sirasu balloons; and fibrous fillers such as asbestos, glass fibers and filaments. For obtaining high strength cured products using such fillers, the use of a filler mainly selected from among fumed silica, precipitated silica, silicic anhydride, hydrous silicic acid, carbon black, surface-treated fine calcium carbonate, calcined clay, clay, activated zinc white and the like in an amount within the range of 1 to 100 parts by weight per 100 parts by weight of the vinyl polymer (I) gives favorable results. When cured products low in strength but high in elongation are desired, the use of a filler selected mainly from among titanium oxide, calcium carbonate, talc, ferric oxide, zinc oxide, sirasu balloons and the like in an amount within the range of 5 to 200 parts by weight per 100 parts by weight of the vinyl polymer (I) gives good results. These fillers may be used singly or two or more of them may be used in admixture.

In the practice of the present invention, the use of a filler in combination with a plasticizer is more effective in increasing the elongation of cured products or enabling the filler to be mixed in large amounts. Usable as the plasticizer, either singly or in combination, according to the physical property or appearance characteristic which is to be adjusted are phthalate esters such as dibutyl phthalate, diheptyl phthalate, di(2-ethylhexyl) phthalate and butyl benzyl phthalate; non-aromatic dibasic acid esters such as dioctyl adipate and dioctyl sebacate; polyalkylene glycol esters such as diethylene glycol dibenzoate and triethylene glycol dibenzoate; phosphate esters such as tricresyl phosphate and tributyl phosphate; chlorinated paraffins; hydrocarbon oils such as alkyldiphenyls and partially hydrogenated terphenyl. The addition thereof is not always necessary, however. It is also possible to incorporate these plasticizers in the step of polymer production. The use of such a plasticizer in an amount within the range of 0 to 100 parts by weight per 100 parts by weight of the vinyl polymer (I) gives good results.

While, in the composition of the invention, a filler, a plasticizer and a condensation catalyst are mainly used, additives may also be used optionally, for example adhesiveness providing agents such as phenol resins, sulfur and silane coupling agents; modifiers such as silanol group- or hydrolyzable group-containing polysiloxanes; tack and weathering resistance improving agents such as ultraviolet-curable resins; pigments, antioxidants and ultraviolet absorbers.

As an antisagging agent, there may be mentioned hydrogenated castor oil derivatives; metal soaps such as calcium stearate, aluminum stearate and barium stearate, and so on. The use thereof is unnecessary in some instances, however, depending on the intended use or as a result of incorporation of a filler, a reinforcing agent and/or the like.

Usable as the colorant when necessary are inorganic pigments, organic pigments and dyes in common use, among others.

As the physical property modifier, there may be added, when necessary, various silane coupling agents, for example alkylalkoxysilanes such as methyltrimethoxysilane, dimethyldimethoxysilane, trimethylmethoxysilane, n-propyltrimethoxysilane; alkylisopropenoxysilanes such as dimethyldiisopropenoxysilane, methyltriisopropenoxysilane and γ-glycidoxypropylmethyldiisopropenoxylsilane, functional group-containing alkoxysilanes such as γ-glycidoxypropylmethyldimethoxysilane, γ-glycidoxypropyltrimethoxysilane, vinyltrimethoxysilane, vinyldimethylmethoxysilane, γ-aminopropyltrimethoxysilane, N-(β-aminoethyl) aminopropylmethyldimethoxysilane, γ-mercaptopropyltrimethoxysilane and γ-mercaptopropylmethyldimethoxysilane; silicone varnishes; polysiloxanes and the like. By using such a physical property modifier, it is possible to increase or decrease the hardness or increase the elongation on the occasion of curing of the composition of the invention.

Another crosslinking silyl-containing polymer may be added to the resin composition of the invention. Another crosslinking silyl-containing polymer is not restricted but includes polysiloxane polymers, polyether polymers, hydrocarbon polymers (polyisobutylene etc.) and the like. The mixing ratio between the polymer (I) of the invention and such other crosslinking silyl-containing polymer is not particularly restricted but physical property adjustment becomes possible by mixing together in various ratios. As an example, the addition of the stellar polymer (I) of the invention is expected to improve the curability of a composition comprising the other crosslinking silyl-containing polymer or improve the strength as compared with the original composition of the other crosslinking silyl-containing polymer.

The resin composition of the invention may be prepared as an one-component preparation by compounding all components/ingredients in advance and storing the whole in a tightly sealed state and, after application, causing the same to be cured by means of the moisture in the air, or as a two-component preparation by separately compounding such ingredients as a curing catalyst, a filler, a plasticizer and water and mixing the same with a polymer composition prior to use.

<<Uses>>

The uses of the resin composition of the invention are described below.

The resin composition comprising the crosslinking silyl-terminated stellar polymer (I) of the invention may have a wide variety of forms, from rubber-like to resin-like, according to the molecular weight and main chain skeleton of the polymer. Therefore, this composition can be utilized in or as sealing compositions, adhesives, elastic adhesives, pressure-sensitive adhesives, coatings, powder coatings, foamed articles, potting agents for electric or electronic use, films, gaskets, various molding materials, etc.

For the composition containing the polymer (I) to be used as a sealing composition, the polymer (I) preferably has a molecular weight (weight average molecular weight) of 1,000 to 1,000,000.

More specific examples of the filler for adjusting the mechanical properties which can be added to the curable composition of the invention when the same is used as a sealing composition are reinforcing fillers such as fumed silica, precipitated silica, silicic anhydride, hydrous silicic acid and carbon black; fillers such as calcium carbonate, magnesium carbonate, diatomaceous earth, calcined clay, clay, talc, titanium oxide, bentonite, organic bentonite, ferric oxide, zinc oxide, activated zinc white and sirasu balloons; and fibrous fillers such as asbestos, glass fibers and filaments. For obtaining high strength cured products using such fillers, the use of a filler mainly selected from among fumed silica, precipitated silica, silicic anhydride, hydrous silicic acid, carbon black, surface-treated fine calcium carbonate, calcined clay, clay, activated zinc white and the like at an addition amount within the range of 1 to 200 parts by weight per 100 parts by weight of the vinyl polymer (I) gives favorable results. When cured products low in strength but high in elongation are desired, the use of a filler selected mainly from among titanium oxide, calcium carbonate, talc, ferric oxide, zinc oxide, sirasu balloons and the like at an addition amount within the range of 1 to 200 parts by weight per 100 parts by weight of the vinyl polymer (I) gives good results. These fillers may be used singly or two or more of them may be used in admixture.

More specific examples of the plasticizer which can be added for adjusting the physical properties and viscosity are phthalate esters such as dibutyl phthalate, diheptyl phthalate, di(2-ethylhexyl) phthalate, diisodecyl phthalate and butyl benzyl phthalate; nonaromatic dibasic acid esters such as dioctyl adipate and dioctyl sebacate; polyalkylene glycol esters such as diethylene glycol dibenzoate and triethylene glycol dibenzoate; phosphate esters such as tricresyl phosphate and tributyl phosphate; polyethylene glycol, polypropylene glycol, or polyethers derived therefrom by conversion of hydroxyl groups thereof; chlorinated paraffins; hydrocarbon oils such as alkyldiphenyls and partially hydrogenated terphenyl. These may be used singly or two or more may be used in admixture. The addition thereof is not always necessary, however. It is also possible to incorporate these plasticizers in the step of polymer production. The use of such a plasticizer at an addition amount within the range of 0.1 to 100 parts by weight per 100 parts by weight of the polymer (I) gives good results.

The sealing composition of the invention may be prepared as an one-component preparation by compounding all components/ingredients in advance and storing the whole in a tightly sealed state and, after application, allowing the same to be cured by absorption of the moisture in the air, or as a two-component preparation by separately compounding such ingredients as a curing catalyst, a filler, a plasticizer and water and mixing the same with a polymer composition prior to use. The one-component type is more preferred, since it can be handled with ease and the possibility of failure in application is slight.

In cases the composition containing the polymer (I) is used as an composition for adhesive compositions, the polymer (I) preferably has a Tg of not higher than −20° C. and preferably has a molecular weight (weight average molecular weight) of 1,000 to 1,000,000. For further improving the adhesiveness against substrates, an acid group-containing monomer is preferably copolymerized.

When the curable composition of the invention is used as an adhesive composition, the addition of a tackifier resin is not always necessary since its main component is the vinyl polymer. When necessary, however, various tackifiers can be used. Specific examples are phenol resins, modified phenol resins, cyclopentadiene-phenol resins, xylene resins, chroman resins, petroleum resins, terpene resins, terpene-phenol resins, rosin esters and the like.

More specific examples of the solvent to be used for adjusting the workability are, among others, aromatic hydrocarbon solvents such as toluene and xylene, ester solvents such as ethyl acetate, butyl acetate, amyl acetate and cellosolve acetate, and ketone solvents such as methyl ethyl ketone, methyl isobutyl ketone and diisobutyl ketone. Those solvents may also be used in the step of polymer production.

The plasticizer is not particularly restricted but includes, among others, liquid polybutene, mineral oils, lanolin, liquid polyisoprene and liquid polyacrylates. The filler is not particularly restricted but includes, among others, zinc white, titanium white, calcium carbonate, clay and various pigments. The antioxidant is not particularly restricted but includes, among others, rubber antioxidants (phenolic, amine type) and metal dithiocarbamates. The above-mentioned tackifiers, plasticizers, fillers and antioxidants may respectively be used singly or two or more species may respectively be used in combination.

The above adhesive composition can be applied to a wide variety of targets such as tapes, sheets, labels and foils. For example, the adhesive composition may be applied in the form of a solvent base, emulsion base or hot melt composition to various substrate materials such as films made of a synthetic resin or modified natural resin, paper, all kinds of cloth, metal foils, metallized plastic foils, asbestos or glass fiber cloths and the like, followed by curing by exposure to moisture or water at ordinary temperature or with heating.

When the composition containing the polymer (I) is used as a composition for coatings, the coatings are required to have a certain hardness and therefore a certain crosslinking density is required. Therefore, the polymer (I) to be used for coating purposes preferably has a crosslinking silyl value of about 20 to 200. Thus, when no crosslinking silyl-containing monomer is copolymerized, the polymer (I) preferably has a number average molecular weight of about 500 to 5,000. However, even a polymer (I) having a number average molecular weight higher than 5,000 can also be used by copolymerizing a crosslinking silyl-containing monomer. The polymer (I) to be used for coating purposes preferably has a Tg of $-30°$ C. to $100°$ C., more preferably $-10°$ C. to $60°$ C. A polymer having a desired Tg can be synthesized by adjusting the species and proportion of the vinyl monomers to be used. When the composition containing the polymer (I) is used as a composition for coatings, this may contain, in addition to the polymer (I), any crosslinking silyl-containing low molecular compound known in the art, any crosslinking silyl-containing polymer known in the art, any resin known in the art for use in coatings, etc.

When the curable adhesive composition of the invention is used as a high-solid coating composition, the method comprising copolymerizing a compound having both a polymerizable alkenyl group and a crosslinking silyl group per molecule with another vinyl monomer may also be mentioned as a preferred method of obtaining a vinyl polymer having a high crosslinking silyl value, since production process is easy. By using such method, high solid contents of coatings can be realized.

Among the compounds having both a polymerizable alkenyl group and a crosslinking silyl group per molecule, those in which the crosslinking silyl group is an alkoxysilyl group are preferred from the cost and/or stability viewpoint. Thus, for example, $CH_2=CHCO_2(CH_2)_3Si(OCH_3)_3$, $CH_2=CHCO_2(CH_2)_3Si(CH_3)(OCH_3)_2$, $CH_2=C(CH_3)CO_2(CH_2)_3Si(OCH_3)_3$ and $CH_2=C(CH_3)CO_2(CH_2)_3Si(CH_3)(OCH_3)_2$ are particularly preferred. These compounds may be used singly or two or more of them may be used combinedly.

The copolymerizing ratio between the compound having both a polymerizable alkenyl group and a crosslinking silyl group per molecule and the other vinyl monomer is not particularly restricted but it is preferred that the compound accounts for 1 to 50 mole percent, preferably 2 to 40 mole percent, more preferably 3 to 30 mole percent, based on the total polymerization composition. When the amount of the compound having both a polymerizable alkenyl group and a crosslinking silyl group per molecule is smaller than 1 mole percent, the curing becomes insufficient and, when it exceeds 50 mole percent, the storage stability becomes low.

When necessary, it is possible to add to this composition for coatings such an additive as a resin, such as polyester, epoxy or acrylic, a coloring auxiliary, a spreading agent, an antifoam or an antistatic agent, in addition to the additives mentioned hereinabove referring to the curable adhesive composition. As more specific examples of the colorant to be used in this coating composition, there may be mentioned inorganic pigments such as titanium dioxide, carbon black, iron oxide and chromium oxide, and organic pigments such as phthalocyanine and quinacridone pigments, among others. The addition amount of these additives can appropriately be selected according to the characteristics required. The additives may also be used in admixture.

When a curing catalyst and an additive(s) are added to the polymer (I) as necessary and the same is applied to an article to be coated and then cured, an uniform coating film can be obtained. The hydrolysis and/or condensation of the crosslinking silyl group proceeds at room temperature, hence heating is not always necessary in the step of curing. For promoting the curing, heating may be applied, however. The heating temperature is 20 to $200°$ C., preferably 50 to $180°$ C.

The coating composition of the invention can be used as a solvent base one or a water base one. It is also possible to use the composition as a powder coating composition by distilling off the volatile matter from the main component vinyl polymer, adding desired ingredients and finely dividing the the same.

When the curable composition of the invention is used as a coating composition which can have a high solid content and is excellent in elastic properties, the crosslinking silyl groups preferably occur at molecular chain termini alone. It is also possible, however, to introduce a crosslinking silyl group into the molecular chain by copolymerizing a small amount of a compound having both a polymerizable alkenyl group and a crosslinking silyl group per molecule to thereby adjust the molecular weight between crosslinking sites.

As examples of such compound, there may be mentioned $CH_2=CHCO_2(CH_2)_3Si(OCH_3)_3$, $CH_2=CHCO_2(CH_2)_3Si(CH_3)(OCH_3)_2$, $CH_2=C(CH_3)CO_2(CH_2)_3Si(OCH_3)_3$, $CH_2=C(CH_3)CO_2(CH_2)_3Si(CH_3)(OCH_3)_2$, $CH_2=CHCO_2(CH_2)_3Si(OC_2H_5)_3$, $CH_2=CHCO_2(CH_2)_3Si(CH_3)(OC_2H_5)_2$, $CH_2=C(CH_3)CO_2(CH_2)_3Si(OC_2H_5)_3$, $CH_2=C(CH_3)CO_2(CH_2)_3Si(CH_3)(OC_2H_5)_2$, $CH_2=CHCO_2(CH_2)_3Si(OC_2H_5)_3$, $CH_2=CHCO_2(CH_2)_3Si(CH_3)(OC_2H_5)_2$, $CH_2=C(CH_3)CO_2(CH_2)_3Si(OC_2H_5)_3$ and $CH_2=C(CH_3)CO_2(CH_2)_3Si(CH_3)(OC_2H_5)_2$.

These compounds may be used singly or two or more of them may be used in admixture.

When the composition containing the polymer (I) is used as an adhesive composition, the polymer (I) preferably has a molecular weight (weight average molecular weight) of 1,000 to 1,000,000. By combining this polymer (I) with a condensation curing agent and the like known in the art, an one-component or two-component adhesive can be obtained. When the composition containing the polymer (I) is used as an adhesive composition, this composition may contain, when necessary, one or more of the additives known in the art, such as tackifiers, coupling agents, thixotropic agents, inorganic fillers and stabilizers. The tackifier is not particularly restricted but includes, among others, terpene resins, phenol resins, terpene-phenol resins, rosin resins and xylene resins. The coupling agent is not particularly restricted but includes, among others, silane coupling agents and titane coupling agents. The inorganic filler is not particularly restricted but includes, among others, carbon black, titanium white, calcium carbonate and clay. The thixotropic agent is not particularly restricted but includes, among others, Aerosil and Disperon. The stabilizer is not particularly restricted but includes, among others, ultraviolet absorbers, antioxidants, heat stabilizers and stabilizers against hydrolysis. The above-mentioned tackfiers, coupling agents, thixotropic agents, inorganic fillers and stabilizers may respectively be used singly or two or more may respectively be used in combination.

The field of application of the above adhesive is not particularly restricted but includes, among others, food packaging adhesives, shoes and footwear adhesives, decorative paper adhesives, wood adhesives, structural adhesives (for cars, septic tanks, houses), magnetic tape binders, fiber processing binders and fiber treating compositions. When the composition containing the polymer (I) is used as a composition for manufacturing artificial leathers and/or synthetic leathers, any of those compounds known in the art for use in preparing artificial leathers and synthetic leathers can be added as necessary to that composition. It includes, for example, chain extenders and solvents. In addition, condensation catalysts, accelerators, pigments, dyes, surfactants, textile softening agents, ultraviolet absorbers, antioxidants, hydrolysis inhibitors, antifungal agents, inorganic fillers, organic fillers, flatting agents, antifoaming agents and the like may also be used.

This composition can be used in producing artificial leathers, or dry process synthetic leathers or wet process synthetic leathers. When the composition containing the polymer (I) is used as a printing ink composition, any of those compounds known in the art for use in printing ink can be used in this composition, as necessary. It includes, for example solvents. Usable as the solvent is one single species or a combination of two or more species selected from among alcohols such as ethanol and isopropanol; ketones such as acetone, MEK, MIBK and cyclohexanone, aromatic hydrocarbons such as toluene and xylene, halogenated hydrocarbons such as chlorobenzene, triclene and perclene, ethers such as THF and dioxane, and esters such as cellosolve acetate, ethyl acetate and butyl acetate. In addition, when necessary, condensation catalysts, accelerators, pigments and other colorants, surfactants, ultraviolet absorbers, antioxidants, hydrolysis inhibitors and so forth can be used. Further, in the production of printing ink compositions, nitrocellulose, polyvinyl chloride, a vinyl chloride-vinyl acetate copolymer, a polyamide, an acrylate ester polymer or the like may be admixed, if necessary.

When the composition containing the polymer (I) is used as a resin composition for flooring materials, any of those compounds known in the art to be added to this compositions for flooring materials, for example solvents and the like, may be used in that composition, as necessary. Usable as the solvent is one single species or a combination of two or more species selected from among alcohols such as ethanol and isopropanol; ketones such as acetone, MEK, MIBK and cyclohexanone, aromatic hydrocarbons such as toluene and xylene, halogenated hydrocarbons such as chlorobenzene, triclene and perclene, ethers such as THF and dioxane, and esters such as cellosolve acetate, ethyl acetate and butyl acetate. In addition, where necessary, condensation catalysts, accelerators, plasticizers, tackifiers, pigments and other colorants, surfactants, ultraviolet absorbers, antioxidants, hydrolysis inhibitors, fillers, antifoaming agents and the like may also be formulated.

The range of application of the above resin composition for flooring use is not particularly restricted but includes, among others, flooring materials for ships and buildings, coating-type waterproofing materials, sheet-type waterproofing materials, spray-on waterproofing materials, sealants, adhesives for artificial turf, paving asphalt modifiers, elastic paving materials for tennis courts and athletic fields, and coated flooring concrete protecting materials.

When the composition containing the polymer (I) is used as a foamed composition, the polymer (I) preferably has a molecular weight (weight average molecular weight) of 1,000 to 1,000,000.

When the composition containing the polymer (I) is used as a foamed composition, the composition may contain water, a surfactant (e.g. silicone-based, nonionic or ionic), various additives (e.g. flameretardant, antimicrobial agent, colorant, filler, stabilizer), a foaming agent, and so on.

In the following, the second aspect of the present invention, namely the resin composition comprising a stellar-structure vinyl block copolymer or chain-extended vinyl block copolymer (II), is described.

The copolymer (II) is preferably produced by forming a block copolymer using the above-mentioned living radical polymerization and adding, at completion of that polymerization reaction, a compound having two or more polymerizable carbon-carbon double bonds.

The compound having two or more polymerizable carbon-carbon double bonds is not particularly restricted but may be any of those specifically mentioned hereinabove.

The vinyl monomer for use is not particularly restricted but the use of any monomers mentioned hereinabove is preferred.

The method of forming the block copolymer using such living radical polymerization as mentioned above is not restricted but includes two alternatives.

The first alternative comprises adding a monomer constituting a second polymer block after completion of the polymerization of a first polymer block. For connecting three or more blocks, a further monomer is added after completion of the polymerization of the second one. Each polymer block may be constituted of a single monomer species or may be a copolymer of two or more monomers in arbitrary proportions.

The second alternative comprises using a macroinitiator. The macroinitiator is a polymer having a group capable of serving as an initiator. The group capable of serving as an initiator is one of the groups described hereinabove referring to the initiator for living radical polymerization. For example, there can be mentioned alkoxyamino groups in the polymerization using a radical capping agent such as a nitroxide compound, the benzyl position in atom transfer radical polymerization, the halogen atom in the a position of an ester, a sulfonyl chloride group and the like. This macroinitiator may be produced not only by living radical polymerization but also by living anionic polymerization, living cationic polymerization or some other polymerization method capable of controlling the structure. When living radical polymerization is carried out using this macroinitiator as the initiator, a block copolymer can be obtained with ease and, when a compound having two or more polymerizable carbon-carbon double bonds is added thereto, a chain-extended or stellar polymer is obtained.

The polymer blocks may be produced by selecting from among all the monomers mentioned above. It is not restricted but at least one of the polymer blocks preferably have a glass transition point of not lower than 25° C. and at least one of the polymer blocks preferably have a glass transition point lower than 25° C.

In the block copolymer (II), the polymer block occurring on the exterior of the copolymer preferably has a higher glass transition point than that of the polymer block occurring on the inside. In that case, it is preferred that the polymer block occurring on the exterior is a methacrylic polymer and the polymer block occurring on the inside is an acrylic polymer or that the polymer block occurring on the exterior is a styrenic polymer and the polymer block occurring on the inside is an acrylic polymer.

<Coupling>

When, at the end point of such living radical polymerization, a compound having two or more polymerizable carbon-carbon double bonds is added, the coupling reaction takes place, giving a chain-extended polymer or a stellar-structure polymer. In that case, according to the amount of the compound having two or more polymerizable carbon-carbon double bonds, there may be formed a chain-extended polymer containing no stellar polymer, or a stellar-structure polymer, as the case may be. The present invention includes both the cases. The end point of polymerization is the time point at which the monomer conversion is preferably not less than 80%, more preferably not less than 90%, still more preferably not less than 95%, most preferably not less than 99%.

The amount of the compound having two or more polymerizable alkenyl groups is not particularly restricted but is preferably such that the number of olefins thereof is at least equal to the number of growing arm polymer termini. At a lower addition amount, uncoupled polymer molecules may remain in large amounts. More preferably, the amount of the compound having two or more polymerizable alkenyl groups, which is not particularly restricted, is such that the number of olefins thereof is not more than 20 times, more preferably not more than 10 times, most preferably not more than 5 times, the number of growing arm polymer termini.

The reaction conditions after addition of this coupling agent are not particularly restricted but may be the same as that of the arm polymer polymerization reactions.

<Uses>

The uses of the resin composition according to the second aspect of the invention is now described.

<Thermoplastic Elastomer>

The resin composition of the invention can be used in the same fields of application as those of styrenic elastomers. Specifically, it can be used in modifying resins or asphalt, in compounding with resins and blocked polymers (if necessary, a plasticizer, filler, stabilizer, etc. may be added), as a shrinkage preventing agent for thermosetting resins, and as a base polymer in adhesives or pressure-sensitive adhesive or damping materials. As specific fields of application, there may be mentioned interior and exterior parts of cars, electric and electronic sectors, food packaging films and tubes, containers or sealable articles for drugs and medical devices, etc.

<Impact Resistance Improving Agent>

While the resin composition of the invention by itself, as a resin having impact resistance, can serve as a molding material, the resin, when used in admixture with various thermoplastic resins and thermosetting resins, can provide these resins with a high level of impact resistance, hence can serve as a impact resistance improving agent. In addition, it can be used as a workability improving agent, solubilizing agent, flatting agent or heat resistance improving agent, for instance.

The thermoplastic resins whose impact resistance can be improved by adding the block copolymer of the invention include polymethyl methacrylate resins, polyvinyl chloride resins, polyethylene resins, polypropylene resins, cyclic olefin copolymer resins, polycarbonate resins, polyester resins, polycarbonate resin-polyester resin mixtures, homopolymers and copolymers obtained by 70 to 100% by weight of at least one vinyl monomer selected from the group consisting of aromatic alkenyl compounds, cyanated vinyl compounds and (meth)acrylic acid esters and 0 to 30% by weight of another vinyl monomer, e.g. ethylene, propylene, vinyl acetate, and/or conjugated diene monomer, e.g. butadiene, isoprene, copolymerizable with such vinyl monomers, polystyrene resins, polyphenylene ether resins, polystyrene resin-polyphenylene ether resin mixtures, although these are not limited thereto. Thus, a wide range of thermoplastic resins can be used. In particular, polymethyl methacrylate resins, polyvinyl chloride resins, polypropylene resins, cyclic polyolefin resins, polycarbonate resins, polyester resins and the like are preferred, since their weather resistance, impact resistance and like characteristics can readily be emphasized.

As a method of adding the polymer of the invention to various resins, there may be mentioned the method comprising effecting mechanical blending and molding into pellets using a per se known apparatus such as a Banbury mixer, roll mill, or twin-screw extruder. The extrusion-molded pellets can be molded in a wide temperature range and, for the molding, a conventional injection molding machine, blow molding machine or extrusion molding machine, for instance can be used.

Further, in this resin composition, there may be incorporated, if necessary, impact resistance improvers, stabilizers, plasticizers, lubricants, flame retardants, pigments, fillers and so forth. As specific examples, there may be mentioned impact resistance improvers such as methyl methacrylate-butadiene-styrene copolymers (MBS resins), acrylic graft copolymers and acrylic-silicone composite rubber graft copolymers; stabilizers such as triphenyl phosphite; lubricants such as polyethylene wax and polypropylene wax; phosphate flame retardants such as triphenyl phosphate and tricresyl phosphate; bromine-containing flame retardants such as decabromobiphenyl and decabromobiphenyl ether; antimony trioxide and like flame retardants; pigments such as titanium oxide, zinc sulfide and zinc oxide; and fillers such as glass fiber, asbestos, wollastonite, mica, talcandcalciumcarbonate, among others.

<Invention Relating to Production Method and Polymer>

The third aspect of the invention lies in the above-mentioned method of producing a stellar vinyl block copolymer or chain-extended vinyl block copolymer, and the fourth aspect of the invention lies in a polymer obtainable by this production method. This polymer includes all the vinyl block copolymers mentioned hereinabove. Further, this polymer is not restricted to those obtained by the production method of the invention.

The polymer of the invention is also characterized, but is not restricted, by the fact that the molecular weight distribution thereof, namely the ratio (Mw/Mn) of the weight average molecular weight (Mw) to the number average molecular weight (Mn) as determined by gel permeation chromatography (GPC), is small. The molecular weight distribution value is preferably not more than 3, more preferably not more than 2, still more preferably not more than 1.8, in particular not more than 1.6, especially not more than 1.4 and most preferably not more than 1.3. In the practice of the invention, the GPC measurements are not restricted but are generally carried out on polystyrene columns using chloroform as the mobile phase. The number average molecular weight and so forth can be determined on the polystyrene equivalent basis. It is known that the molecular weight of a stellar polymer as determined by GPC generally has a lower value than the true molecular weight.

BEST MODES FOR CARRYING OUT THE INVENTION

The following examples illustrate the invention in further detail. These examples are, however, by no means limitative of the scope of the invention.

In the examples, "part(s)" means "part(s) by weight".

The molecular weights reported in the examples were determined in the following manner using the GPC apparatus shown below. System: Waters GPC system, column: Showa Denko model Shodex K-804 (polystyrene gel), mobile phase: chloroform; the number average molecular weight and so on were expressed on the polystyrene equivalent basis.

REFERENCE EXAMPLE 1

A 10-L separable flask equipped with a reflux condenser and a stirrer was charged with CuBr (42.0 g, 0.293 mol) and the reactor inside was purged with nitrogen. Acetonitrile (559 mL) was added and the contents were stirred on an oil bath at 70° C. for 45 minutes. Thereto were added butyl acrylate (1.00 kg), diethyl 2,5-dibromoadipate (176 g, 0.488 mol) and pentamethyldiethylenetriamine (4.00 mL, 3.32 g, 19.2 mmol) (hereinafter referred to as "triamine"), and the reaction was thus started. While heating at 70° C. with stirring, butyl acrylate (4.00 kg) was added dropwise over 190 minutes. During the addition of butyl acrylate, triamine (4.00 mL, 3.32 g, 0.0192 mol) was added. After the lapse of 310 minutes following the start of reaction, 1,7-octadiene (1.44 L, 1.07 kg, 9.75 mol) and triamine (20.5 mL, 17.0 g, 98.1 mmol) were added and the heating at 70° C. was continued for 210 minutes with stirring.

The reaction mixture was diluted with hexane, the dilution was passed through an activated alumina column, and the volatile matter was distilled off under reduced pressure to give an alkenyl-terminated polymer (polymer [1]). The polymer [1] had a number average molecular weight of 14,000 and a molecular weight distribution of 1.34.

A 10-L separable flask equipped with a reflux condenser was charged with the polymer [1] (2.7 kg), potassium benzoate (142 g) and N,N-dimethylacetamide (2.7 L), and the contents were heated at 70° C. with stirring for 25 hours in a nitrogen atmosphere. The N,N-dimethylacetamide was then removed with heating under reduced pressure, and the residue was diluted with toluene. The solid matter (KBr and excess potassium benzoate) insoluble in toluene was filtered off using an activated alumina column. The volatile matter was distilled off under reduced pressure from the filtrate to give a polymer (polymer [2]).

A 2-litter round-bottom flask equipped with a reflux condenser was charged with the polymer [2] (2.7 kg), aluminum silicate (540 g, product of Kyowa Kagaku, Kyowaad 700 PEL) and toluene (2.7 L), and the mixture was heated at 100° C. for 5 hours in a nitrogen atmosphere. The aluminum silicate was then filtered off and, from the filtrate, the toluene was distilled off under reduced pressure to give a polymer (polymer [3]).

A one-liter pressure reactor was charged with the polymer [3] (760 g), dimethoxymethylhydrosilane (46.3 mL, 0.38 mol), methyl orthoformate (13.7 mL, 0.13 mmol) and platinum(0)-1,1,3,3-tetramethyl-1,3-divinyldisiloxane complex. The amount of the platinum catalyst used was $10^{-3}$ equivalent in the mole ratio relative to the alkenyl group of the polymer. The reaction mixture was heated at 100° C. for 1 hour. From this mixture, the volatile fraction was distilled off under reduced pressure to give a silyl-terminated polymer (polymer [4]). The average number of silyl groups introduced per polymer molecule as determined by $^1$H NMR analysis was 2.0.

EXAMPLE 1

Synthesis of an Si Group-terminated Star Polymer

A 100-mL glass reactor was charged with cuprous bromide (0.500 g, 3.49 mmol) and acetonitrile (5.00 mL) in a nitrogen atmosphere, and the contents were heated at 70° C. for 30 minutes. Thereto were added 5-dimethoxymethylsilylpentyl 2-bromopropionate (2.85 g, 8.72 mmol) and butyl acrylate (50.0 mL, 0.349 mol). After 30 minutes of stirring at 70° C., the polymerization was initiated by adding pentamethyldiethylenetriamine (46.0 μL, 0.436 mmol) and, 15 minutes later, pentamethyldiethylenetriamine (46.0 μL, 0.436 mmol) was further added. After the lapse of 95 minutes following the initiation of polymerization, the rate of polymerization was 94%. To this polymerization system were added p-divinylbenzene (1.86 mL, 13.1 mmol) and pentamethyldiethylenetriamine (1.18 mL, 5.67 mmol), and the heating was continued to give a star polymer.

EXAMPLE 2

Cured Product of the Si Group-terminated Star Polymer

Upon addition of a tin-based alkoxysilyl condensation catalyst, the polymer produced in Example 1 underwent curing. This cured product was higher in strength as compared with the cured product from the linear polymer of Reference Example 1.

EXAMPLE 3

Block Star Polymer Synthesis—1

To obtain an acrylic-acrylic star type block copolymer, the following procedure was performed. The polymerization space of a 500-mL separable flask was purged with nitrogen, 2.00 g (14 mmol) of copper bromide was weighed and placed therein, and 10 mL of acetonitrile (dried using molecular sieves and then bubbled with nitrogen) was added. After 5 minutes of heating at 70° C. with stirring, the mixture was cooled to room temperature and the initiator ethyl 2-bromopropionate and 37.8 mL (349 mmol) of ethyl acrylate (hereinafter, "EA") were added. While heating at 70° C. with stirring, 0.030 mL (1.4 mmol) of the ligand diethylenetriamine was added to thereby initiate the polymerization. Following the initiation of polymerization, about 0.2-mL portions of the polymerization mixture were sampled from the polymerization mixture at timed intervals and analyzed by gas chromatography for determining the conversion rates of EA. At a time point when the conversion of EA was in excess of 90%, 50.0 mL (349 mmol) of butyl acrylate (hereinafter, "BA") was added. The conversion rates of BA were determined in the same manner. At a time point when the conversion of BA was in excess of 90%, 3.0 mL (21 mmol) of p-divinylbenzene was added. The conversion rates of the divinylbenzene were determined in the same manner. After confirmation of the divinylbenzene conversion having exceeded 90% and a viscosity increase characteristic of the formation of a star polymer, the reaction mixture was cooled to room temperature and the reaction was thus completed.

Throughout the reaction, the polymerization mixture had a green color.

The copper complex was removed by filtering the reaction mixture through activated alumina. The filtrate obtained was added to a large amount of methanol to cause precipitation of the polymer, and the polymer obtained was dried under vacuum at 60° C. for 24 hours to give the desired block copolymer (M-1).

The polymer obtained was subjected to GPC analysis. The EA polymer before addition of BA had a number average molecular weight (Mn) of 3,600 and a molecular weight distribution Mw/Mn of 1.23, the block copolymer after polymerization of BA had a number average molecular weight (Mn) of 6,600 and a molecular weight distribution Mw/Mn of 1.28, and the star block copolymer after polymerization of divinylbenzene had a number average molecular weight (Mn) of 24,000 and a molecular weight distribution Mw/Mn of 2.03.

EXAMPLE 4

Block Star Polymer Synthesis—2

A desired block copolymer (M-2) was obtained in the same manner except that the order of monomer addition in Production Example 1 was modified and thus BA was used as the monomer of the first block and EA as the monomer of the next block.

The polymer obtained was subjected to GPC analysis. The BA polymer before addition of EA had a number average molecular weight (Mn) of 3,000 and a molecular weight distribution Mw/Mn of 1.12, the block copolymer after polymerization of EA had a number average molecular weight (Mn) of 6,200 and a molecular weight distribution Mw/Mn of 1.27, and the star block copolymer after polymerization of divinylbenzene had a number average molecular weight (Mn) of 18,300 and a molecular weight distribution Mw/Mn of 2.20.

INDUSTRIAL APPLICABILITY

The invention, which has the above constitution, gives a curable composition comprising a crosslinking silyl-terminated stellar-structure polymer as synthesized from various radical-polymerizable monomers. The polymer of the invention is also characterized by its narrow molecular weight distribution and therefore the physical properties of the composition of the invention can be adjusted with ease. The curable composition of the invention can be varied in appearance from rubber-like to resin-like, according to the molecular weight and main chain skeleton of the polymer and the formulation.

Further, the invention, which has the above constitution, makes it possible to obtain, with ease, a chain-extended polymer or a stellar-structure polymer, in which each arm polymer is a block copolymer by using the living radical polymerization. The polymer of the invention is also characterized by its narrow molecular weigh distribution. The polymer of the invention has a very well controlled structure and, therefore, various physical properties thereof, such as viscosity, mechanical properties, compatibility and refractive index, can be controlled. Thus, the polymer can be utilized as a thermoplastic elastomer or impact resistance improver.

What is claimed is:

1. A resin composition which comprises a crosslinking silyl-terminated stellar-structure vinyl polymer (I).

2. The resin composition according to claim 1, wherein the polymer (I) is obtained by performing living radical polymerization of a vinyl monomer and adding, at the end point of the polymerization, a compound having two or more polymerizable carbon-carbon double bonds.

3. The resin composition according to claim 2, wherein the compound having two or more polymerizable carbon-carbon double bonds comprises at least one compound represented by the following general formula (1), (2) or (3):

wherein $R^1$ is a phenyl group, —CN or —$CO_2R^3$, in which $R^3$ is a monovalent hydrocarbon group containing 1 to 20 carbon atoms, $R^2$ is a divalent or polyvalent hydrocarbon group containing 1 to 20 carbon atoms or a divalent or polyvalent group containing 1 to 20 carbon atoms resulting from the binding of two or more hydrocarbon groups via an ester or ether bond, and n is an integer not less than 2;

wherein $R^4$ is a hydrogen atom, a methyl group or a monovalent hydrocarbon group containing 1 to 20 carbon atoms, $R^5$ is a divalent or polyvalent benzene or naphthalene group and n is an integer of not less than 2;

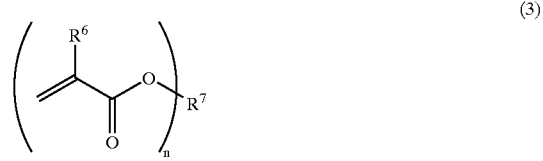

wherein $R^6$ is a hydrogen atom, a methyl group, —CN or a monovalent hydrocarbon group containing 1 to 20 carbon atoms, $R^7$ is a divalent or polyvalent hydrocarbon group containing 1 to 20 carbon atoms or a divalent or polyvalent group containing 1 to 20 carbon atoms resulting from the binding of two or more hydrocarbon groups via an ester or ether bond, and n is an integer not less than 2.

4. The resin composition according to claim 3, wherein the compound having two or more polymerizable carbon-carbon double bonds is divinylbenzene or diisopropenylbenzene.

5. The resin composition according to claim 2,
wherein the vinyl monomer comprises at least one species selected from the group consisting of (meth)acrylic monomers, acrylonitrile monomers, aromatic vinyl monomers, fluorine-containing vinyl monomers and silicon-containing vinyl monomers.

6. The resin composition according to claim 2,
wherein the living radical polymerization is carried out in the manner of atom transfer radical polymerization.

7. The resin composition according to claim 6,
wherein the metal complex to be used as the catalyst for atom transfer radical polymerization comprises at least one metal complex of the metal selected from the group consisting of complexes of copper, nickel, ruthenium and iron.

8. The resin composition according to claim 6,
wherein an initiator used in the atom transfer radical polymerization has a functional group other than a functional group serving to initiate the polymerization.

9. The resin composition according to claim 8,
wherein the functional group other than the functional group serving to initiate the polymerization is a hydroxyl group.

10. The resin composition according to claim 8,
wherein the functional group other than the functional group serving to initiate the polymerization is a crosslinking silyl group.

11. The resin composition according to any of claim 1,
wherein the polymer (I) has a molecular weight distribution of not more than 2 as expressed in terms of the ratio (Mw/Mn) between the weight average molecular weight (Mw) and number average molecular weight (Mn) determined by gel permeation chromatography (GPC).

12. The resin composition according to claim 1,
which further contains a crosslinking silyl-terminated polymer other than the polymer (I).

13. The resin composition according to claim 12,
wherein the crosslinking silyl-terminated polymer is a hydrocarbon polymer.

14. A sealant
which comprises the resin composition according to claim 1.

15. An adhesive
which comprises the resin composition according to claim 1.

16. A resin composition which comprises a stellar-structure vinyl block copolymer or chain-extended vinyl block copolymer (II),
wherein a monomer used for the stellar-structure vinyl block copolymer or chain-extended vinyl block copolymer (II) is at least one monomer selected from the group consisting of (meth)acrylic monomers, fluorine-containing vinyl monomers, maleic anhydride, maleic acid, monoalkyl esters of maleic acid, dialkyl esters of maleic acid, fumaric acid, monoalkyl esters of fumaric acid, dialkyl esters of fumaric acid, maleimide monomers, nitrile-containing vinyl monomers, amido-containing vinyl monomers, vinyl esters, alkenes, vinyl chloride, vinylidene chloride, allyl chloride, and allyl alcohol; and a compound having two or more polymerizable carbon-carbon double bonds used for the stellar-structure vinyl block copolymer or chain-extended vinyl block copolymer (II) is at least one compound represented by the following general formula (1), (2) or (3):

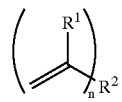

(1)

wherein $R^1$ is a phenyl group, —CN or —$CO_2R^3$, in which $R^3$ is a monovalent hydrocarbon group containing 1 to 20 carbon atoms, $R^2$ is a divalent or polyvalent hydrocarbon group containing 6 to 20 carbon atoms having a benzene ring or a divalent or polyvalent group containing 6 to 20 carbon atoms having a benzene ring resulting from the binding of two or more hydrocarbon groups via an ester or ether bond, and n is an integer not less than 2;

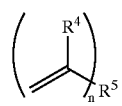

(2)

wherein $R^4$ is a hydrogen atom, a methyl group or a monovalent hydrocarbon group containing 1 to 20 carbon atoms, $R^5$ is a divalent or polyvalent benzene or naphthalene group and n is an integer of not less than 2;

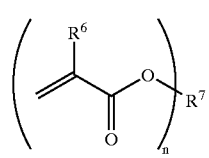

(3)

wherein $R^6$ is a hydrogen atom, a methyl group, —CN or a monovalent hydrocarbon group containing 1 to 20 carbon atoms, $R^7$ is a divalent or polyvalent hydrocarbon group containing 6 to 20 carbon atoms having a benzene ring or a divalent or polyvalent group containing 6 to 20 carbon atoms having a benzene ring resulting from the binding of two or more hydrocarbon groups via an ester or ether bond, and n is an integer not less than 2.

17. The resin composition according to claim 16,
wherein the block copolymer (II) is obtained by forming a block copolymer using the living radical polymerization and adding, at the end point of the polymerization, a compound having two or more polymerizable carbon-carbon double bonds.

18. The resin composition according to claim 16,
wherein the block copolymer (II) comprises polymer blocks each of which comprises at least one monomer selected from the group consisting of (meth)acrylic monomers, acrylonitrile monomers, fluorine-containing vinyl monomers and silicon-containing vinyl monomers.

19. The resin composition according to any of claim 16,
wherein at least one of the polymer blocks constituting the block copolymer (II) has a glass transition point not lower than 25° C.

20. The resin composition according to any of claim 16,
wherein at least one of the polymer blocks constituting the block copolymer (II) has a glass transition point lower than 25° C.

21. The resin composition according to any of claim 16,
wherein the polymer block occurring on the exterior of the block copolymer (II) has a glass transition point higher than the glass transition point of the polymer block occurring on the inside.

22. The resin composition according to claim 21, wherein, in the block copolymer (II), the polymer block occurring on the exterior of the copolymer is a methacrylic polymer and the polymer block occurring on the inside is an acrylic polymer.

23. The resin composition according to claim 21, wherein, in the block copolymer (II), the polymer block occurring on the exterior of the copolymer is a styrenic polymer and the polymer block occurring on the inside is an acrylic polymer.

24. A thermoplastic elastomer which comprises the resin composition according to claim 16.

25. An impact strength improving agent which comprises the resin composition according to claim 16.

26. A method of producing a stellar-structure vinyl block copolymer or chain-extended vinyl block copolymer which comprises forming a block copolymer using the living radical polymerization and adding, at the end point of the polymerization, a compound having two or more polymerizable carbon-carbon double bonds; wherein a monomer used for the stellar-structure vinyl block copolymer or chain-extended vinyl block copolymer (II) is at least one monomer selected from the group consisting of (meth)acrylic monomers, fluorine-containing vinyl monomers, maleic anhydride, maleic acid, monoalkyl esters of maleic acid, dialkyl esters of maleic acid, fumaric acid, monoalkyl esters of fumaric acid, dialkyl esters of fumaric acid, maleimide monomers, nitrile-containing vinyl monomers, amido-containing vinyl monomers, vinyl esters, alkenes, vinyl chloride, vinylidene chloride, allyl chloride, and allyl alcohol; and the compound having two or more polymerizable carbon-carbon double bonds is at least one compound represented by the following general formula (1), (2) or (3):

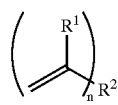  (1)

wherein $R^1$ is a phenyl group, —CN or —CO$_2$R$^3$, in which $R^3$ is a monovalent hydrocarbon group containing 1 to 20 carbon atoms, $R^2$ is a divalent or polyvalent hydrocarbon group containing 6 to 20 carbon atoms having a benzene ring or a divalent or polyvalent group containing 6 to 20 carbon atoms having a benzene ring resulting from the binding of two or more hydrocarbon groups via an ester or ether bond, and n is an integer not less than 2;

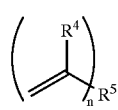  (2)

wherein $R^4$ is a hydrogen atom, a methyl group or a monovalent hydrocarbon group containing 1 to 20 carbon atoms, $R^5$ is a divalent or polyvalent benzene or naphthalene group and n is an integer of not less than 2;

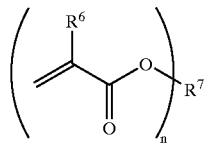  (3)

wherein $R^6$ is a hydrogen atom, a methyl group, —CN or a monovalent hydrocarbon group containing 1 to 20 carbon atoms, $R^7$ is a divalent or polyvalent hydrocarbon group containing 6 to 20 carbon atoms having a benzene ring or a divalent or polyvalent group containing 6 to 20 carbon atoms having a benzene ring resulting from the binding of two or more hydrocarbon groups via an ester or ether bond, and n is an integer not less than 2.

27. The method according to claim 26, wherein the compound having two or more polymerizable carbon-carbon double bonds is divinylbenzene or diisopropenylbenzene.

28. The method according to claim 26, wherein the living radical polymerization is carried out in the manner of atom transfer radical polymerization.

29. The method according to claim 28, wherein the metal complex to be used as the catalyst for atom transfer radical polymerization comprises at least one metal complex of the metal selected from the group consisting of copper, nickel, ruthenium and iron.

30. The method according to claim 29, wherein the metal complex to be used as the catalyst for atom transfer radical polymerization is a copper complex.

31. The method according to claim 26, wherein the living radical polymerization is carried out using a macroinitiator as an initiator.

32. The method according to claim 26, wherein the copolymer produced has a molecular weight distribution of not more than 2 as expressed in terms of the ratio (Mw/Mn) between the weight average molecular weight (Mw) and number average molecular weight (Mn) determined by gel permeation chromatography (GPC).

33. A stellar-structure vinyl block copolymer or chain-extended vinyl block copolymer obtainable by the method according to claim 26.

34. The resin composition according to claim 1, wherein a monomer used for the crosslinking silyl-terminated stellar-structure vinyl polymer (I) is at least one monomer selected from the group consisting of (meth)acrylic monomers, fluorine-containing vinyl monomers, maleic anhydride, maleic acid, monoalkyl esters of maleic acid, dialkyl esters of maleic acid, fumaric acid, monoalkyl esters of fumaric acid, dialkyl esters of fumaric acid, maleimide monomers, nitrile-containing vinyl monomers, amido-containing vinyl monomers, vinyl esters, alkenes, vinyl chloride, vinylidene chloride, allyl chloride, and allyl alcohol.

35. The resin composition according to claim 1, wherein a compound having two or more polymerizable carbon-carbon double bonds used for the crosslinking silyl-terminated stellar-structure vinyl polymer (I) is at least one compound represented by the following general formula (1), (2) or (3):

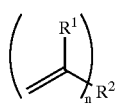

(1)

wherein $R^1$ is a phenyl group, —CN or —$CO_2R^3$, in which $R^3$ is a monovalent hydrocarbon group containing 1 to 20 carbon atoms, $R^2$ is a divalent or polyvalent hydrocarbon group containing 6 to 20 carbon atoms having a benzene ring or a divalent or polyvalent group containing 6 to 20 carbon atoms having a benzene ring resulting from the binding of two or more hydrocarbon groups via an ester or ether bond, and n is an integer not less than 2;

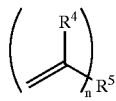

(2)

wherein $R^4$ is a hydrogen atom, a methyl group or a monovalent hydrocarbon group containing 1 to 20 carbon atoms, $R^5$ is a divalent or polyvalent benzene or naphthalene group and n is an integer of not less than 2;

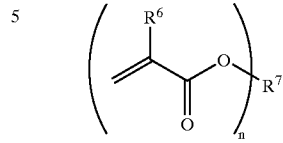

(3)

wherein $R^6$ is a hydrogen atom, a methyl group, —CN or a monovalent hydrocarbon group containing 1 to 20 carbon atoms, $R^7$ is a divalent or polyvalent hydrocarbon group containing 6 to 20 carbon atoms having a benzene ring or a divalent or polyvalent group containing 6 to 20 carbon atoms having a benzene ring resulting from the binding of two or more hydrocarbon groups via an ester or ether bond, and n is an integer not less than 2.

36. The resin composition of claim 12, wherein the crosslinking silyl-terminated polymer is a polyether polymer or vinyl polymer.

\* \* \* \* \*